United States Patent [19]
Isshiki et al.

[11] Patent Number: 5,695,259
[45] Date of Patent: Dec. 9, 1997

[54] ANTILOCK BRAKE SYSTEM

[75] Inventors: Isao Isshiki; Hitoshi Hashiba; Yoshiharu Nakai; Seiji Ueda, all of Osaka; Takao Nozaki; Masahide Hio, both of Mie-ken, all of Japan

[73] Assignees: Sumitomo Wiring Systems, Ltd., Mie-ken; Sumitomo Electric Industries, Ltd., Osaka, both of Japan

[21] Appl. No.: 570,810

[22] Filed: Dec. 12, 1995

Related U.S. Application Data

[63] Continuation of Ser. No. 132,275, Oct. 6, 1993, abandoned.

[30] Foreign Application Priority Data

| Oct. 6, 1992 | [JP] | Japan | 4-293766 |
| Oct. 26, 1992 | [JP] | Japan | 4-311196 |
| Nov. 2, 1992 | [JP] | Japan | 4-317845 |
| Nov. 2, 1992 | [JP] | Japan | 4-317847 |
| Nov. 25, 1992 | [JP] | Japan | 4-358473 |
| Feb. 5, 1993 | [JP] | Japan | 5-042259 |

[51] Int. Cl.$^6$ ............................... B60T 8/00
[52] U.S. Cl. ........................... 303/119.2; 439/34
[58] Field of Search ........................ 303/20, 113.1, 303/116.1, 119.1, 119.2; 439/34, 639, 76, 923; 335/202, 278; 336/92

[56] References Cited

U.S. PATENT DOCUMENTS

| 4,697,863 | 10/1987 | Galloway et al. | 439/544 |
| 5,040,853 | 8/1991 | Burgdorf et al. | 439/76 X |
| 5,137,455 | 8/1992 | Moerbe et al. | 439/34 |
| 5,288,141 | 2/1994 | Isshiki et al. | 303/113.1 |
| 5,407,260 | 4/1995 | Isshiki et al. | 303/113.1 X |
| 5,452,948 | 9/1995 | Cooper et al. | 303/113.1 X |

FOREIGN PATENT DOCUMENTS

| 2823666 | 12/1979 | Germany . | |
| 3307654 | 9/1984 | Germany . | |
| 6-247270 | 9/1994 | Japan | 202/113.1 |
| 2249874 | 5/1992 | United Kingdom . | |
| 9112428 | 8/1991 | WIPO . | |

*Primary Examiner*—Josie Ballato
*Attorney, Agent, or Firm*—Sughrue, Mion, Zinn, Macpeak & Seas, PLLC

[57] ABSTRACT

This invention aims to enhance a production efficiency of an automobile provided with an antilock brake system. A united assembly of an electronic unit 6 and a junction block 7 is detachably mounted on a side face of a hydraulic power unit 5 which controls a pressure of brake fluid. The junction block 7 is provided with a set of terminals 74A connected to solenoids and the like of the hydraulic power unit 5, a set of terminals 74B connected directly or indirectly to a battery 21, a set of terminals 74C and 74D connected to relays 9 and 10, and a set of terminals 74E connected to a circuit of the electronic unit 6. These sets of terminals 74A to 74E are connected through bus bars 74, respectively. It is possible to reduce the number of wire harnesses extending between an engine compartment and a car interior and to realize various kinds of lay-out in the engine compartment.

21 Claims, 29 Drawing Sheets

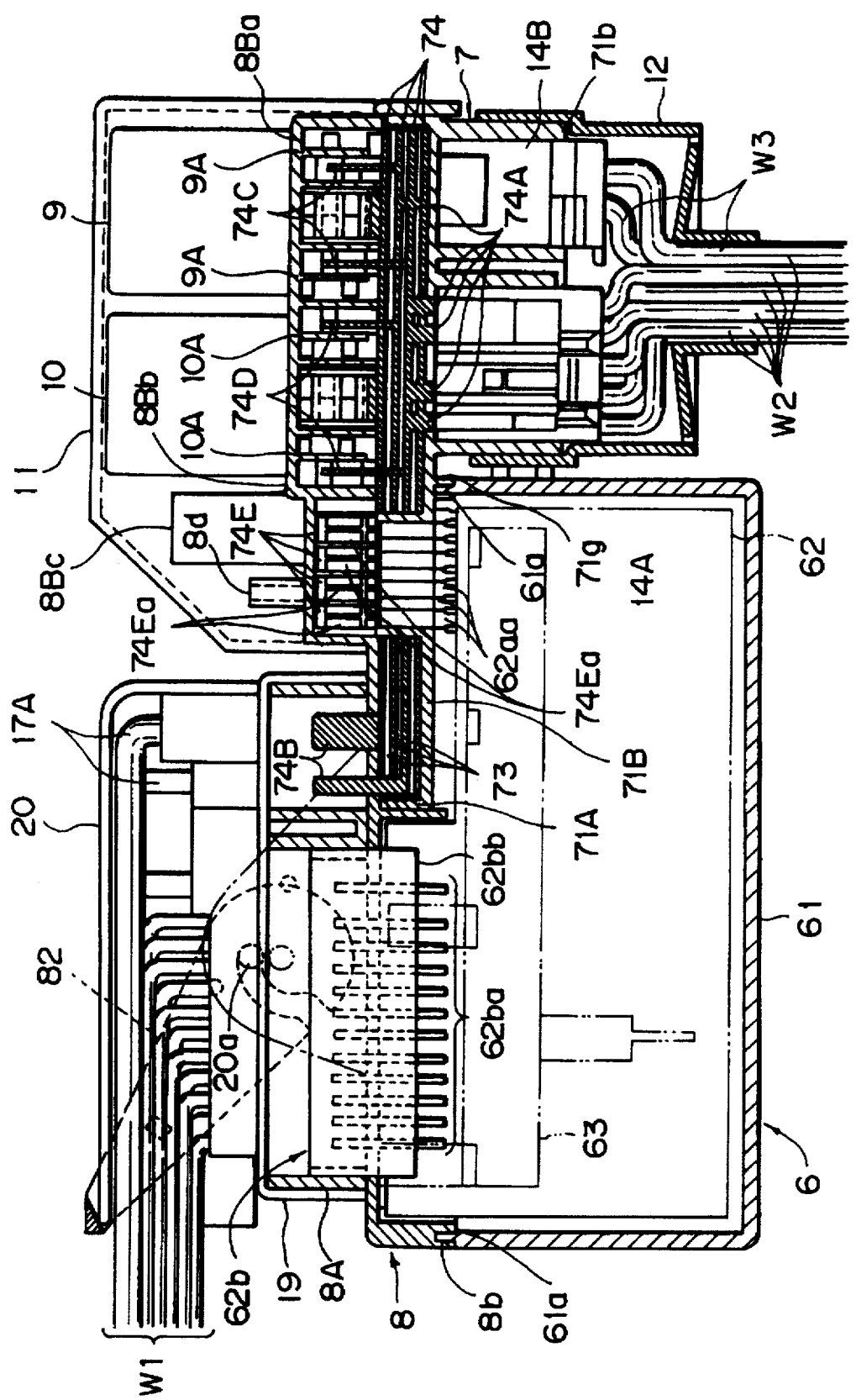

ANTILOCK BRAKE SYSTEM

This is a Continuation of application Ser. No. 08/132,275 filed Oct. 6, 1993 now abandoned.

BACKGROUND OF THE INVENTION

1. Field of the Invention

This invention relates to an antilock brake system in an automobile which prevents wheels from becoming locked upon emergency braking or when braking on a slippery road by means of adjusting a pressure of a brake fluid, and more particularly to an antilock brake system having an assembly in which an electronic unit is integrally mounted on a hydraulic power unit.

2. Statement of the Prior Art

There is known an antilock brake system which prevents the wheels in an automobile from being locked during emergency braking or braking on a slippery road, as a system for enhancing the safety of an automobile. Recently, the automobiles provided with such an antilock brake system have become common place.

For convenience of explanation, a conventional antilock brake system will be described below by referring to FIGS. 26 and 27. FIG. 26 is a schematic explanatory view of the prior antilock brake system in the automobile and FIG. 27 is a diagram showing the electrical system of the antilock brake system.

As shown in FIGS. 26 and 27, a conventional antilock brake system comprises rotation detectors 101 to 104, a hydraulic power unit 105, an electronic unit 106 and a relay box 107.

The rotation detectors 101 to 104 are provided on wheels A to D respectively to detect a rotating condition thereof. The rotation detectors 101 to 104 are provided with sensors 101a to 104a and sensor rotors 101b to 104b, respectively. The sensors 101a to 104a are made of, for example, a permanent magnet, a coil, or a pole piece. The sensor is attached to a steering knuckle at the front wheel and to a hub spindle at the rear wheel. On the other hand, each of the sensor rotors 101b to 104b is provided on the outer periphery with serrations (not shown) formed uniformly along the peripheral direction. The sensor rotor is attached to a drive shaft at the front wheel and to a rear hub at the rear wheel. Accordingly, sensor rotors 101b to 104b rotate together with the wheels A to D, respectively. The sensors 101a to 104a detect the rotating condition of the wheels A to D by sensing the serrations on the outer periphery of the sensor rotors 101b to 104b during their rotations. The rotation detectors 101 to 104 transmit detecting signals from the sensors 101a to 104a to an electronic unit 108 to be described hereinafter.

The hydraulic power unit 105 is provided with four solenoid valves 105a to 105d for corresponding wheels. The hydraulic power unit 105 control on-off operations of the solenoid valves 105a to 105d in accordance with control signals from the electronic unit 108, thereby controlling the pressure of a brake fluid supplied to wheel cylinders of the wheels A to D. The hydraulic power unit 105 has a motor 105e which drives a pump (not shown) to flow brake fluid to a master cylinder (not shown).

The electronic unit 108 receives the detecting signals from the rotation detectors 101 to 104 and monitors whether or not there is any wheel in a direction to be locked when it is braked in accordance with the detecting signal. In the case that there is a wheel in the direction to be locked, the electronic unit 108 controls the hydraulic power unit 105 so that the pressure of brake fluid supplied to the wheel cylinder of the corresponding wheel is decreased. In the case that possible locking of the corresponding wheel is avoided, the pressure of the brake fluid is increased again.

A relay box 107 contains a motor relay 107a which switches the motor on and off and a fail-safe relay 107b which shuts off a signal to solenoid valves 105a to 105d of the hydraulic power unit 105 in the case that an abnormal state occurs in the antilock brake system.

In the prior antilock brake system, the hydraulic power unit 105 and relay box 107 are disposed in an engine compartment as shown in FIG. 28. On the contrary, the electronic control section 108 is generally disposed in a car interior such as in the space under a seat or within a front panel. The rotation detectors 101 to 104 are provided on the wheel sections as described before.

In FIG. 27, 108 is a battery for an automobile as a power source for the antilock brake system, 109 an ignition switch, 110 a stop lamp switch disposed in the vicinity of a brake pedal, 111 a stop lamp constituting a part of a rear lamp, 112 a warning lamp for indicating an abnormal state in the antilock brake system and 113 a diode for lightening the warning lamp 112. The diode 113 is disposed between lower streams of the warning lamp 112 and the contact of the fail-safe relay 107b.

In the modern automobiles, the number of electronic control sections is increasing in keeping with an increase in performance while at the same time it is desired to maintain the interior of cars as spacious as possible. However, the electronic unit 108 provided in a car interior requires a long wire harness to connect the rotation detectors 1 to 4 in the engine compartment to the unit 106.

Further, since the hydraulic power unit 105 in the engine compartment is provided separate from the electronic control section 108 in the car interior in the prior system, it is necessary to provide a wire harness which electrically interconnect them. This lowers the production efficiency of automobiles. In particular, since the latest automobiles are provided with many systems which have not been provided in conventional automobiles, as well as antilocking braking systems, the number of wiring steps has increased and harness working has become very complicated. Accordingly, it has been desired to decrease the number of wiring steps in order to simplify working thereof.

In the case that the electronic unit is disposed in the engine compartment, it is desired to reduce the space taken up by the electronic unit and for a junction block to be as small as possible. On the other hand, a connector cover is often required to cover a connector connected to the junction block. The space defined by the electronic unit and junction block described above must include a space defined by the connector cover. Since the connector cover is mounted on the junction block in the last assembling step, it is necessary to consider assembly efficiency. In order to minimize the space defined by the electronic unit, the junction block and the connector cover and to assure proper attachment of the connector cover, the connector cover may be mounted on the junction block at a position near the electronic unit.

However, in the case that the connector cover is disposed near the electronic unit, the connector cover will contact with the electronic unit to thereby generate noise in the engine compartment of the automobile, which is subject to various kinds of vibration. If a distance between the electronic unit and the connector cover becomes large in order to avoid the generation of noise, the space defined by the junction block and electronic unit also becomes large.

Also, a printed circuit plate accommodating unit is provided in a control system for an automobile such as the prior antilock brake system or the like. For convenience of explanation a prior printed circuit plate accommodating unit will be described below by referring to FIGS. 28 to 32. FIGS. 28 to 32 are schematic cross sectional views of the prior printed circuit plate accommodating unit, which illustrate the respective steps of assembling the unit.

The prior printed circuit plate accommodating unit is generally divided into an upper housing 201 and a lower housing 202 as shown in FIG. 32 in order to simplify a step of accommodating the printed circuit plate therein. In the unit, after parts such as the printed circuit plate 203 or the like have been accommodated and secured in one housing (for example, the lower housing 202 in FIG. 32), the other housing (for example, the upper housing 201) is coupled to the one housing.

Also, in the prior printed circuit plate accommodating unit, a part 204 to be cooled such as a power transistor or the like is mounted on the printed circuit plate 203. In this case, usually, a heat radiation member 205 is Connected to the part 204 and the lower housing 202 so that heat radiation of the member 205 and the lower housing 202 suppresses the part 204 from rising in temperature.

On the other hand, the prior printed circuit plate accommodating unit may be provided with a connector 206 which connects an external electrical circuit to the printed circuit plate 203. In the prior unit, after the connector 206 is indirectly connected to the lower housing 202 with the connector 208 being electrically connected to the printed circuit plate 203, the upper housing 201 is coupled to the lower housing 202 so that the connector 206 is disposed in a connector receiving opening 201a in the upper housing 201.

A general process of assembling the prior printed circuit plate accommodating unit will be explained below by referring to FIGS. 28 to 32.

First, as shown in FIG. 28, part 204 is secured to the heat radiation member 205 made of an aluminum material and having an L-shaped cross section.

Second, as shown in FIG. 29, a pin terminal 204a of the part 204 is connected to a given terminal on the printed circuit plate 203.

Thirdly, as shown in FIG. 30, a body of the connector 206 is secured to the printed circuit plate 203 and a pin terminal 206a of the connector 206 is connected to a given terminal of the printed circuit plate 203.

Fourthly, as shown in FIG. 31, the heat radiation member 205 of a module formed in the state shown in FIG. 30 is fixed on the lower housing 202 made of aluminum.

Fifthly, as shown in FIG. 32, while the connector 206 is being inserted into the connector receiving opening 201a in the upper housing 201, the upper housing 201 is coupled to the lower housing 202. Thus, the assembling process is finished.

However, there is in the prior printed circuit plate accommodating unit shown in FIG. 32 a problem that a clearance L between the connector 206 and the opening 201a in the upper housing 201 must be relatively large for the reasons described below.

First, in the prior printed circuit plate accommodating unit, a module comprising the heat radiation member 205, the part 204, and the connector is formed by the steps shown in FIGS. 28 to 30.

A position Y of a side of the connector 206 with respect to a reference position X of an end of the heat radiation member 205 is changed within a first maximum length $\alpha 1$ totalling the respective size errors of the heat radiation member 205, the part 204, the printed circuit plate 203, and the connector 206 and attaching errors of the respective coupling portions of them.

In the steps of securing the heat radiation member 205 to the lower housing 202 and coupling the upper housing 201 to the lower housing 202 as shown in FIGS. 31 and 32, a position Z of an inner wall of the connector receiving opening 201a with respect to the reference position X (an end of the heat radiation member 205) is changed within a second maximum length $\alpha 2$ adding an attaching error between the heat radiation member 205 and the lower housing 202 to an attaching error between the lower and upper housings 202 and 201.

It will be apparent from the foregoing that the clearance L between the connector 208 and the connector receiving opening 201a in the upper housing 201 should be decided in view of the lengths $\alpha 1$ and $\alpha 2$ in the prior printed circuit plate accommodating unit. The clearance L becomes relatively large.

The relatively large clearance L raises a problem that dust and the like easily enter into the interior of the housings through the clearance between the connector 206 and the connector receiving opening 201a and that the size of the entire unit becomes relatively large.

SUMMARY OF THE INVENTION

A first object of the present invention is to provide an antilock brake system in which an electronic unit is integrally coupled to a hydraulic power unit in an engine compartment of an automobile, thereby enlarging the interior space of an automobile and simplifying a harness working.

A second object of the present invention is to provide an antilock brake system having an electronic unit provided integrally with a junction box which can enlarge the interior space of an automobile and simplify the harness-working by disposing the electronic unit in the engine compartment and simplify a wire harness in the engine compartment.

A third object of the present invention is to provide an antilock brake system having an electronic unit provided integrally with a junction block having a common use.

A fourth object of the present invention is to provide an antilock brake system which requires less space in an engine compartment for its electronic unit together with a junction block mounted on a hydraulic power unit.

A fifth object of the present invention is to provide an antilock brake system having an electronic unit provided integrally with a junction block which can protect a printed circuit plate from vibration, heat, water, and the like in the engine compartment.

A sixth object of the present invention is to provide an antilock brake system having an electronic unit provided integrally with a junction block which can be disposed in an engine compartment of an automobile, enlarge the available space of a car interior, simplify a harness working, and prevent the generation of noise due to vibrations in the automobile.

A seventh object of the present invention is to provide an antilock brake system having a printed circuit plate accommodating unit which can reduce a clearance between a connector and a connector receiving opening.

In order to achieve the first object, an antilock brake system of the present invention comprises:

a sensor for detecting a rotating condition of each wheel of an automobile;

a hydraulic power unit having coupling ports for brake fluid pipes and for controlling a pressure of brake fluid in a wheel cylinder of each wheel by means of an electrical control signal, said coupling ports being provided on an upper, front, or rear wall of said unit;

an electronic unit containing a circuit for generating said control signal which controls said pressure of brake fluid so that the wheel is not locked in response to a detecting signal from said sensor; and a junction block having a housing formed integrally with a housing of said electronic unit and an electrical wiring section disposed in said junction block housing and electrically connecting said circuit of said electronic unit and a circuit of said hydraulic power unit, a united assembly of said electronic unit and said junction block being detachably coupled to an attaching portion formed on a side face of said hydraulic power unit.

In this antilock brake system, it is unnecessary to dispose any parts constituting the antilock brake system in the interior of the automobile since the electronic unit is integrally mounted on the junction block having an electrical wiring section to be connected to a circuit of the electronic unit. Consequently, there is no wire harness extending between the prior electronic unit in the car interior and the hydraulic power unit in the engine compartment. Also, since the united assembly of the electronic unit and the junction block is disposed on the side of the hydraulic power unit, the electronic unit and the junction block do not obstruct an arrangement of pipes in the hydraulic power unit.

In addition, the antilock brake system further comprises:

a plurality of relays connected electrically to at least one of said circuits of said hydraulic power unit and said electronic unit and disposed in an engine compartment of the automobile;

a first connector connected to a wire harness from an electrical system including wheel speed sensors, a battery, an ignition switch and the like but excluding the hydraulic power unit and relays; and a second connector connected to a wire harness including wires connected to said hydraulic power unit;

wherein said junction block has a housing formed integrally with a housing of said electronic unit and an electrical wiring section disposed in said junction block housing, said wiring section including a first set of terminals connected electrically to said first connector, a second set of terminals connected electrically to said second connector, a third set of terminals connected electrically to said respective relays, and a fourth set of terminals connected electrically to said circuit of said electronic unit. The united assembly of said electronic unit and said junction block being detachably coupled to an attaching portion formed on a side face of said hydraulic power unit.

The wire harness from the system is connected to this antilock brake system by connecting the first connector to the first set of terminals in the housing of the junction in addition to the above operation. It is possible to apply the control signal from the circuit in the electronic unit to the hydraulic power unit through the electrical wiring section in the junction block by connecting the second connector to the second set of terminals. Further, it is possible to electrically inter-connect the hydraulic unit, relays and electronic unit circuit through the junction block by interconnecting the third terminal in the junction block and the relays, and interconnecting the fourth set of terminals and the electronic unit circuit.

In the antilock brake system of the present invention, said hydraulic power unit is further provided on opposite side faces with attaching portions for mounting said united assembly of said electronic unit and said junction block.

It is possible in this antilock brake system to change the portions of the electronic unit and the junction block if desired by providing the opposite side faces of the hydraulic power unit with the attaching portion for mounting the united assembly of the electronic unit and the junction block.

In order to achieve the above second and third objects, the antilock brake system of the present invention further comprises:

a first set of terminals provided in said electronic unit and connected electrically to an electrical system including wheel speed sensors, a battery, an ignition switch and the like but excluding the hydraulic power unit and relays;

a second set of terminals provided in said junction block and connected electrically to the wire harness from the system;

a housing member integrally forming at least a part of said housing of said electronic unit and at least a part of said housing of said junction block; and a connector socket enclosing said first and second sets of terminals and detachably mating with a connector connected to an end of the wire harness from the system.

Interconnections between the wire harness from the system and the first set of terminals and between the wire harness from the system and the second set of terminals are simultaneously carried out by coupling the connector connected to the distal end of the wire harness from the system to the connector socket formed in the housing member in the united assembly of the junction block and electronic unit. It is not necessary to connect the wire harness from the system to the electronic unit through the junction block since the wire harness from the system is directly connected to the electronic unit.

In order to achieve the above first and fourth objects, in the antilock brake system of the present invention said electronic unit has a printed circuit plate containing a circuit for generating said control signal which controls said pressure of brake fluid so that the wheel is not locked in response to a detecting signal from said sensor, and wherein said united housings of said electronic unit and junction block are mounted on said hydraulic power unit with said printed circuit plate of said electronic unit being disposed in said housings vertically in the plate surface direction.

In this antilock brake system, the plane projection area of the electronic unit becomes small in comparison with the case when the printed circuit plate is disposed horizontally with respect to the plate surface by mounting the housings of the electronic unit and junction block on the hydraulic power unit with the printed circuit plate being disposed vertically with the surface plate.

In the antilock brake system of the present invention, said united assembly of said electronic unit and said junction block is further disposed on a side face of said hydraulic power unit at the position in which the projection of the side face of said united assembly exists within a rectangular plane defined by the maximum height and depth of said hydraulic power unit.

In this antilock brake system, it is possible to dispose the united assembly of the electronic unit and the junction block on the side face of the hydraulic power unit so that the united assembly does not protrude from the side face in the height and depth.

In order to achieve the first and fifth objects, in the antilock brake system of the present invention, the interior of said housing of said electronic unit is filled with an insulation gel.

In this antilock brake system, the printed circuit plate is water-proofed by the insulation gel filled in the housing of the electronic unit. Further, it is possible to reduce a vibration of the printed circuit plate and absorb a heat radiated from the printed circuit plate by the gel.

In the antilock brake system of the present invention, said housing of said electronic unit is further provided with a sol-pouring port.

In this antilock brake system, it is possible to pour the sol through the port into the housing of the electronic unit to form the insulation gel in the housing after uniting the electronic unit and the junction block.

In the antilock brake system of the present invention, said electronic unit further has a first connecting section for connecting said printed circuit plate to said electrical wiring section of said junction block and a second connecting section for connecting said printed circuit plate to a wire harness from the system wherein an upper end of said printed circuit plate at a position corresponding to said second connecting section is higher than an upper end of said printed circuit plate at a position corresponding to said first connecting section, wherein said junction block is disposed above said printed circuit plate of said electronic unit at a position corresponding to said first connecting section, and said housing of said junction block includes a lower housing comprising a side wall the lowest portion on an upper side of which is higher than an upper end of said printed circuit plate at a position corresponding to said second connecting section, and a bottom plate continued to said side wall, at least a part of said bottom plate being a part of an upper housing of said electronic unit.

According to the antilock brake system, it is possible to embed the position corresponding to the first connecting section in the insulation gel even if the position corresponding to the second connecting section is higher than the position corresponding to the second connecting section, since the insulation gel is filled to the limit at the lowest position on the upper side of the side wall of the lower housing of the junction block.

In the antilock brake system of the present invention, at least an upper portion of said lower housing of said junction block is closed by said upper housing, a terminal electrically connected to an electrical element mounted on said upper housing stands on said electrical wiring section, a sol-pouring port is provided on a common portion of said housings of said electronic unit and junction block, a cover which covers said electrical element and said sol-pouring port is mounted on said upper housing, and said cover is provided on the interior with a protrusion which chokes said sol pouring port when mounted on said upper housing.

According to the antilock brake system, the cover can enclose the electrical element and close the pouring port by mounting the cover on the upper housing.

In order to achieve the sixth object, in the antilock brake system a connector cover which covers a connector coupled to a connector socket is mounted on said junction block united on said electronic unit, and said electronic unit and connector cover are provided with a pair of male and female coupling portions which serve to guide said connector cover when it is mounted on said junction block and to maintain at a given distance a gap between outer peripheries of said electronic unit and said connector cover mounted on said junction block by a difference between a height of the male portion and a depth of the female portion.

According to this antilock brake system, it is possible to mount on the junction block the connector cover which encloses the connector while guiding the connector cover by the pair of male and female coupling portions. Even if any vibrations are applied to the united assembly of the junction block and electronic unit, the coupling portions can maintain the gap between the connector cover and the electronic unit to be a given value and can avoid the collision between them due to the vibration.

In order to achieve the seventh object, in the antilock brake system said printed circuit plate is disposed in a space defined by said upper housing and said lower housing made of metal, a heat radiation member is interposed between said lower housing and a part to be heat-radiated on said printed circuit plate, and a connector having a connecting terminal connected electrically to said circuit on said printed circuit plate is put on a connector coupling portion formed on said upper housing, and said heat radiation member has a fixing portion of said upper housing and a fixing portion of said connector.

According to this antilock brake system, since the connector is directly attached to the connector fixing portion of the heat radiation member and the upper housing is attached to the upper housing fixing portion, the part and the printed circuit plate causes displacement of the position the connector or the connector coupling portion with respect to the heat radiation member. Only the dimensional errors of the heat radiation member, connector, lower housing, and upper housing may be considered as a cause of displacement of the connector or the connector coupling portion.

BRIEF DESCRIPTION OF THE DRAWINGS

FIGS. 6A, 6B and 6C are longitudinal sectional views of FIGS. 3A and 3B;

DETAILED DESCRIPTION OF THE PREFERRED EMBODIMENTS

Referring now to FIGS. 1 to 8, a first aspect an antilock brake system of the present invention will be explained below.

Figure 7:
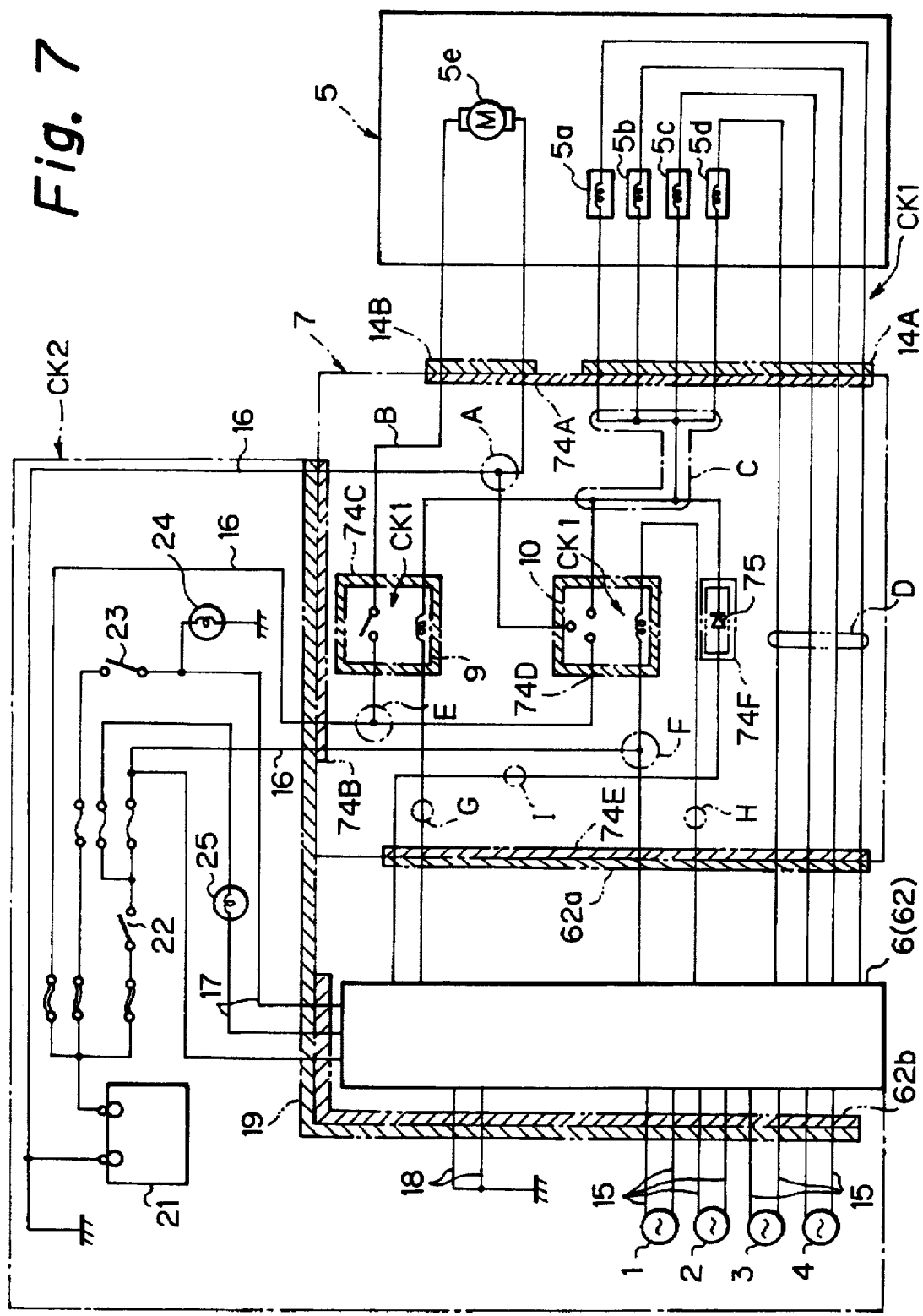
FIG. 7 is an electrical diagram of the antilock brake system which is useful in understanding the preferred embodiments of the present invention.
Figure 27:
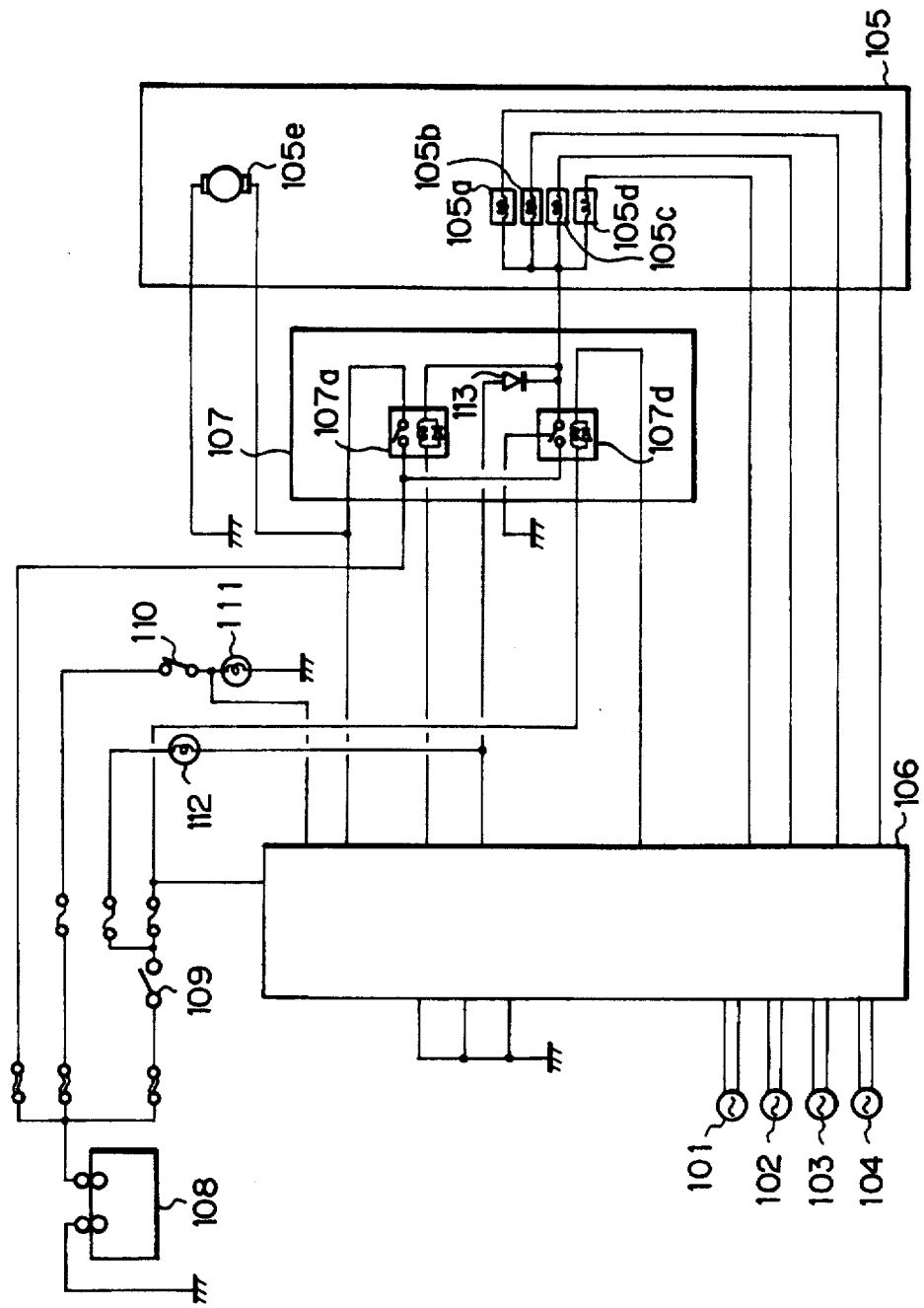
FIG. 27 is an electrical diagram of the prior antilock brake system.
Figure 28:
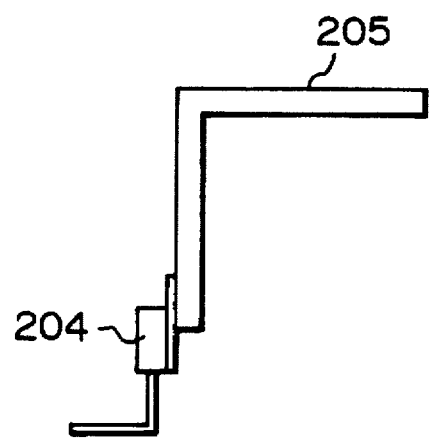
FIG. 28 is a schematic cross sectional view of a prior printed circuit plate accommodating unit illustrating a step of assembling the unit.
Figure 29:
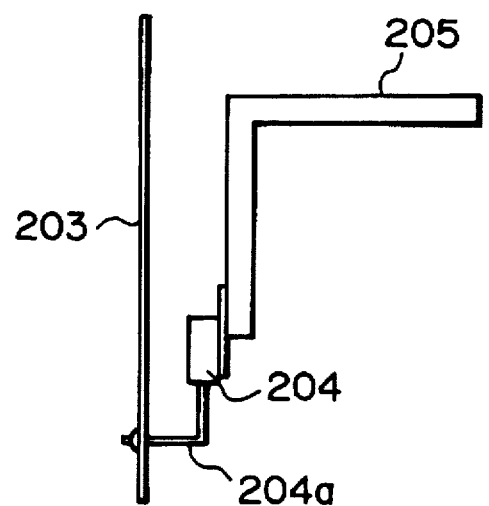
FIG. 29 is a schematic cross sectional view of a prior printed circuit plate accommodating unit illustrating a step of assembling the unit.
Figure 30:
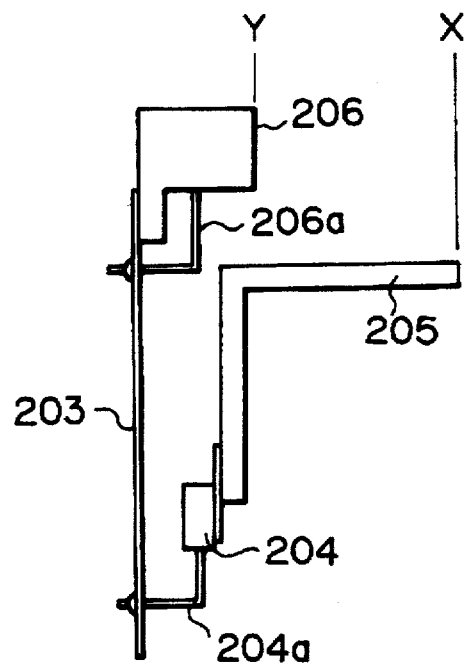
FIG. 30 is a schematic cross sectional view of a prior printed circuit plate accommodating unit illustrating a step of assembling the unit.
Figure 31:
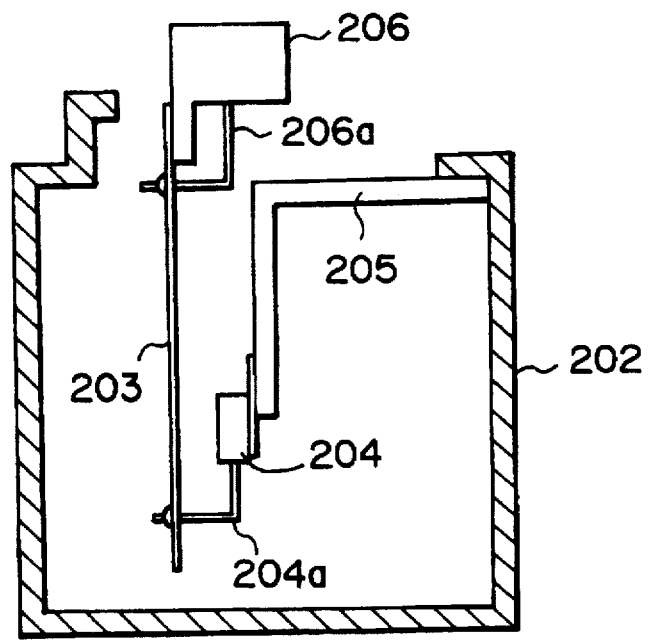
FIG. 31 is a schematic cross sectional view of a prior printed circuit plate accommodating unit illustrating a step of assembling the unit.
Figure 32:
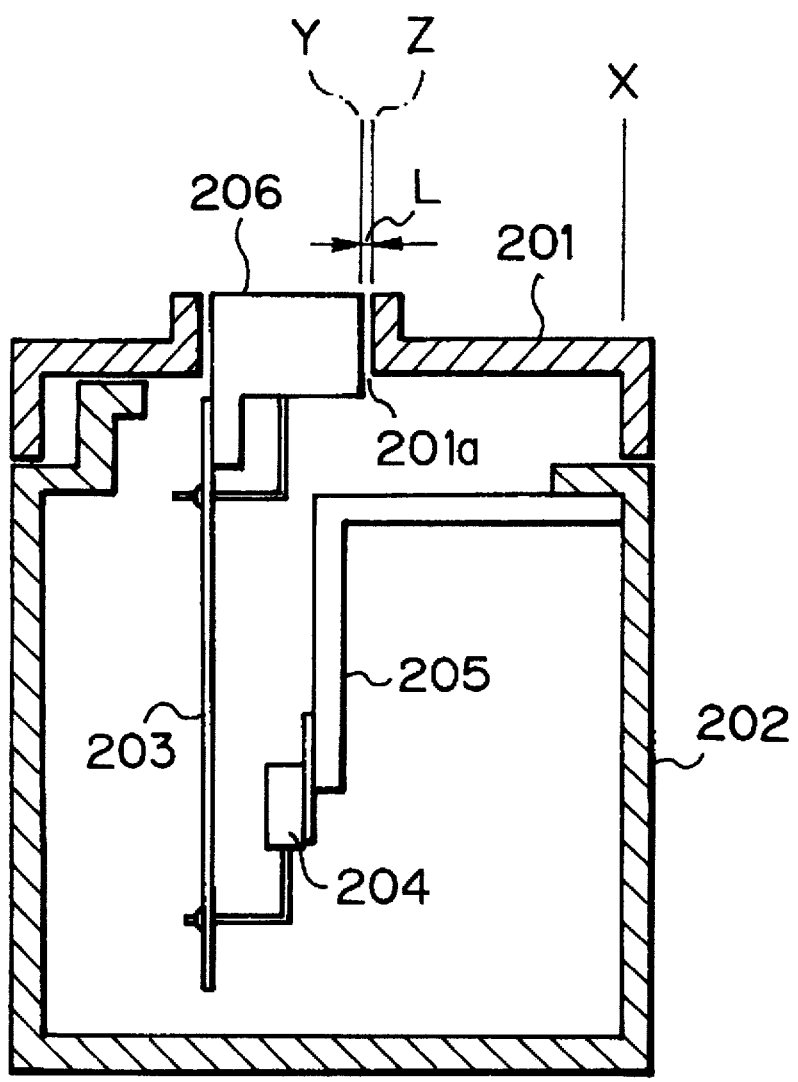
FIG. 32 is a schematic cross sectional view of a prior printed circuit plate accommodating unit illustrating a step of assembling the unit.

The aspect of the antilock brake system shown in FIG. 7 is substantially the same as the conventional antilock brake system shown in FIG. 27 with respect to its electrical construction and operation. Accordingly, the operation of the antilock brake system will not be explained here.

The aspect of the antilock brake system comprises a hydraulic power unit 5, an electronic unit 6, a junction block 7, an upper housing 8, relays 9, 10, a relay cover 11, and a connector cover 12 in the same manner as that shown in FIGS. 1 to 8.

The hydraulic power unit 5, electronic unit 6, relays 9, 10 and a diode 75 correspond to the hydraulic power unit 105, electronic unit 106, motor relay 107a, fail-safe relay 107b, and diode 113 in the prior antilock brake system, respectively.

In FIG. 7, 21 denotes a battery for an automobile, 22 an ignition switch, 23 a stop lamp switch disposed near a brake pedal, 24 a stop lamp which constitutes a part of a rear lamp, and 25 a warning lamp which indicates an abnormal state in the antilock brake system, respectively.

Figure 2:
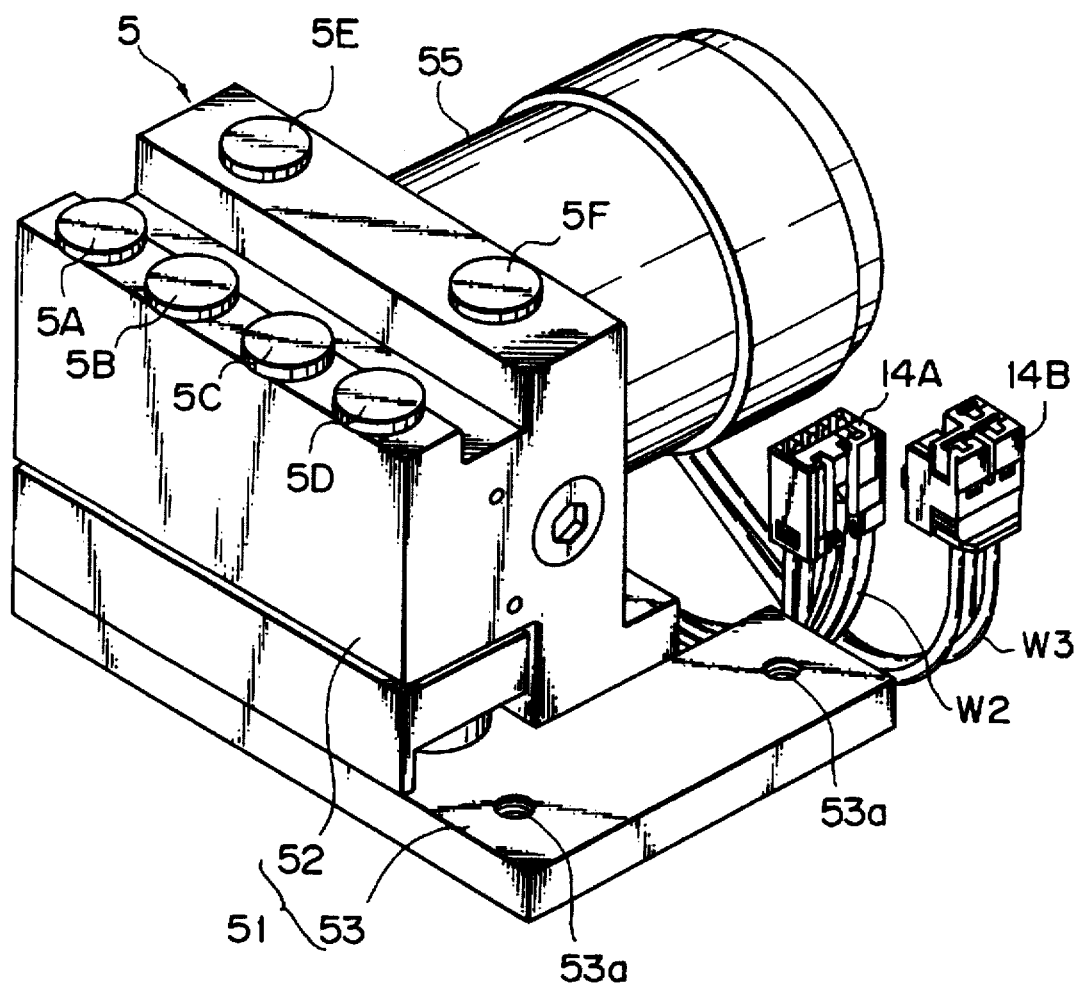
FIG. 2 is a perspective view of a hydraulic unit.

Electrical connection between the hydraulic power unit 5 and the junction block 7 is formed by coupling connectors 14A and 14B connected to a circuit of the hydraulic power unit 5 through wire harnesses W2 and W3 to terminals 74A united to a bus bar 74 which constitutes a wiring in the junction block 7 (FIGS. 2 and 6).

Figure 6A:
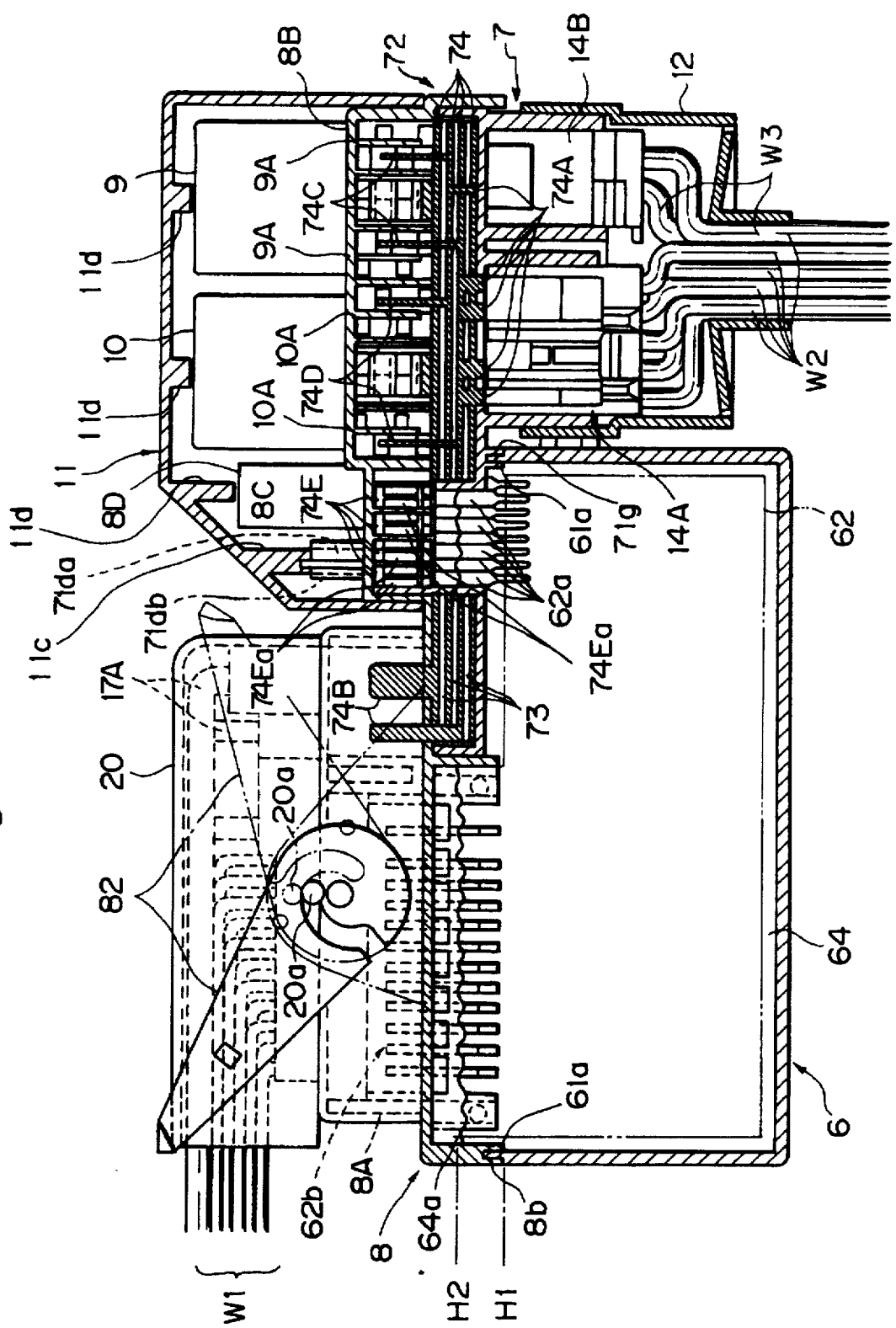

The electronic unit 6 is electrically connected to the junction block 7 by connecting terminals 62a connected to a printed circuit plate 62 in the electronic unit 8 to terminals 74E united to the bus bar 74 (FIG. 6A).

The relays 9 and 10 are electrically connected to the junction block 7 by connecting terminals 9A and 10A of the relays 9 and 10 to terminals 74C and 74D united to the bus bar 74 (FIG. 6A).

Figure 1:
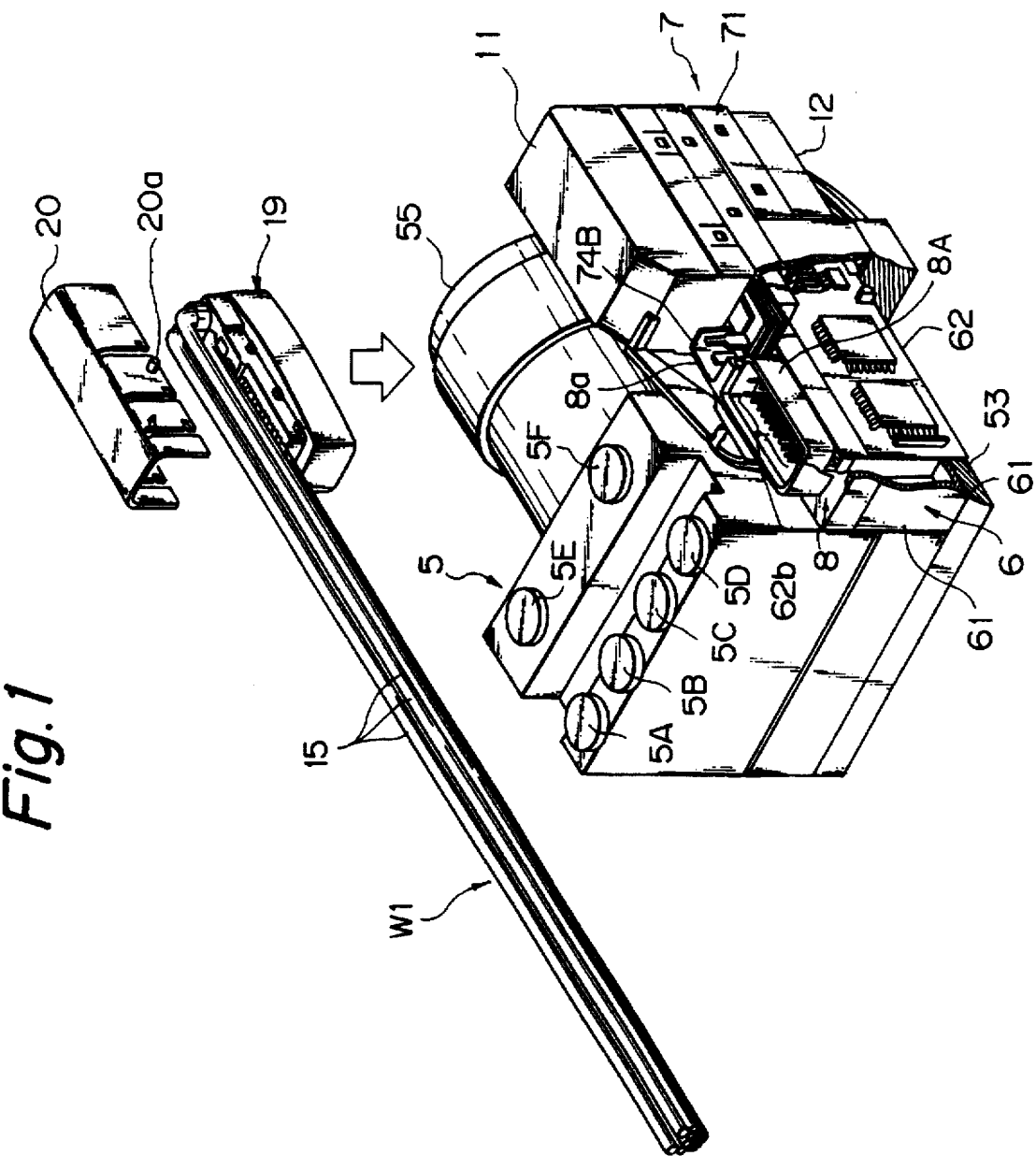
FIG. 1 is a perspective view of a main part of an antilock brake system of the present invention.

A part of electric source lines 16 connected to the battery 21 can be connected to the junction block 7 by coupling a connector 19 connected to the electric source lines 16 to a connector socket 6A formed in the upper housing 8 (FIGS. 1 and 6A).

A signal supply line 15 connected to sensors 1 to 4, electric source lines 17 exclusive of the electric power lines 16 connected to the battery 21, and ground lines 18 can be connected to the electronic unit 6 by coupling the connector 19 connected to these lines together with the electric power lines 16 to the connector socket 8A (FIGS. 1 and 6A).

Constructions of the hydraulic power unit electronic unit 6, junction block 7 and relays 9 and 10 will be described in detail below.

A housing 51 of the hydraulic power unit 5 comprises a housing body 52 and a base 53 (FIG. 2). Solenoid valves 5a to 5d (FIG. 7) and flow control valves (not shown) which operate in connection with opening and closing of the solenoid valves 5a to 5d are accommodated in the housing body 52. The housing body 52 is provided on the upper face with coupling ports 5A to 5F for brake fluid pipes connected to brake master cylinders or wheel cylinders (not shown). The housing body 52 is provided rear side with a motor 55 coupled to a plunger pump of the hydraulic power unit 5.

The base 53 is a kind of board which extends from the side of the hydraulic power unit 5 at the lower end of the housing body 52. The base 53 is provided with bolt holes 53a which are adapted to couple a housing 81 of the electronic unit 6 to the base 53. The hydraulic power unit 5 has wire harnesses W2 and W3 connected to the solenoid valves 5a to 5d, the motor 55 and the like. Connectors 14A and 14B are connected to the ends of the wire harnesses W2 and W3. The operation of the hydraulic power unit 5 is the same as that of the prior hydraulic power unit 105 and thus the detailed explanation of it is omitted here.

The electronic unit 6 has a box like lower housing which is provided with an opening at the upper end and made of an aluminum material. The lower housing 61 is secured to the base 53 of the hydraulic power unit 5 by bolts (not shown) screwed in the bolt holes 53a.

Figure 4A:
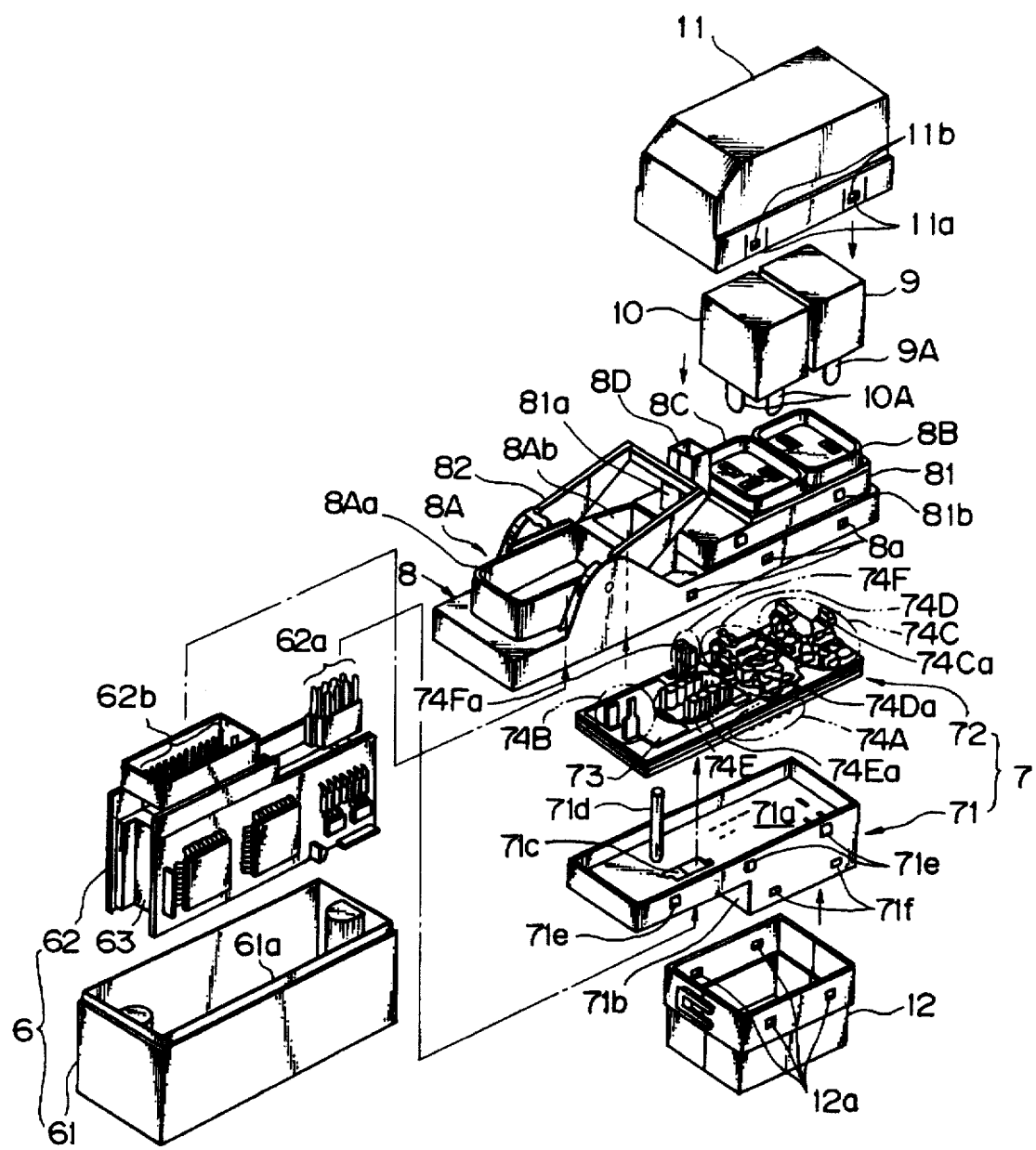
FIGS. 4A and 4B are exploded perspective views of FIGS. 3A and 3B, respectively.
Figure 4B:
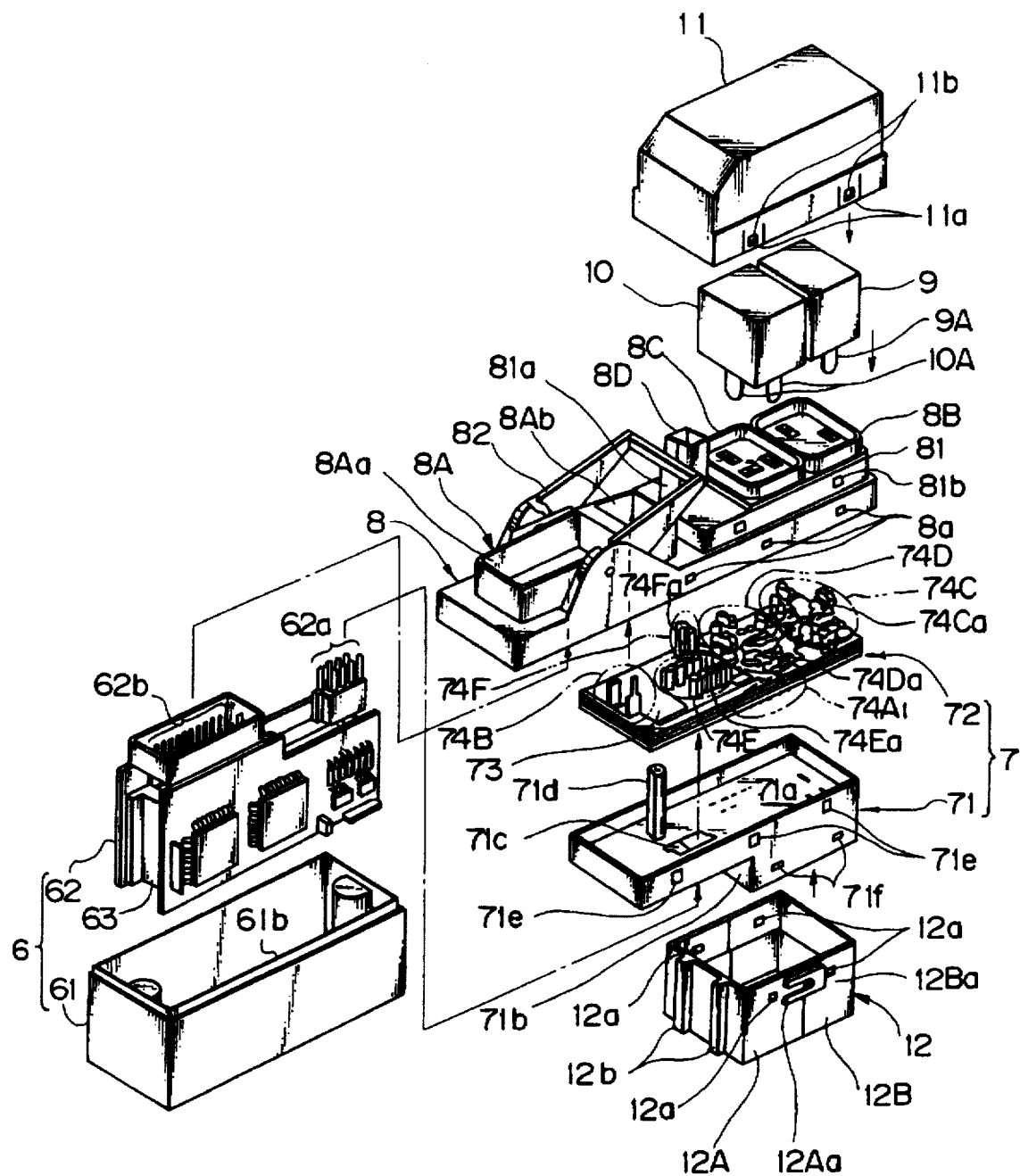

A printed circuit plate 62 of the electronic unit 6 is secured to a base support 63 and is fixedly accommodated in the lower housing 61 together with the base support 63. The printed circuit plate 62 supports elements which constitutes a control circuit of the electronic unit. External terminals of the plate 62 are connected to terminal sections 62a or 62b. The terminal sections 62a are constituted by terminals which contact with terminals 74E in the junction block 7 described hereinafter. The terminal section 62b is constituted by terminals in the connector 19 which contact with terminals of the connecting lines 15 of the sensors 1 to 4, the electronic power lines 17, and the ground lines 18. The terminal sections 62a and 62b are mounted on the base support The upper end opening in the lower housing 61 which accommodates the printed circuit plate 62 and base support 63 is closed by a lower housing 71 of the junction block T and an upper housing 8. As shown in FIGS. 4A and 6A, the lower housing 61 is provided on the upper periphery with a projection 61a adapted to mate with a groove 74 in the lower housing 71 of the junction block 7 and a groove 8b in the upper housing 8.

The junction block 7 includes the lower housing 71 with the upper end opening and a junction body 72 accommodated in the lower housing 71.

The lower housing 71 has an open space 71a for accommodating the junction body 72 (FIG. 4A). The lower housing 71 is provided on a lower face extending from the center to the rear end with a connector attaching portion 71b which receives the connectors 14A and 14B. As shown in FIG. 4A, the lower housing 71 is provided with an apertures 71e for the terminal section 62a on the lower face. A gel-pouring pipe 71d stands near the aperture 71c on the lower housing 71. The pouring pipe 71d serves to pour a gel into the lower housing 61 of the electronic unit 6. Further, the lower housing 71 of the junction block 7 is provided on the side wall with a first engaging projection 71e for the upper housing 8 and below the first projection 71e on the side wall with a second engaging projection 71f for the connector cover 12. The lower housing 71 is also provided With a groove 71g for the projection 61a of the lower housing 61 on the lower face between the connector attaching portion 71b and the aperture 71c (FIG. 6A).

The junction body 72, as shown in FIG. 6A, has a plurality of insulation plates 73 and a plurality of bus bars 74 which constitute wirings in the junction block 7 and are mounted on the insulation plates 73. The bus bars 74 are displaced on the upper face of the insulation plate 73, between the two plates 73, or the lower face of the plate 73. The bus bars 74 are fixed on the insulation plate 73 by way of, for example, holes being formed in the bus bars 74, bosses being formed on the insulation plate 73 in opposition to the holes, with the bosses inserted into the holes then being crushed.

The junction block V has terminals 74A projecting downwardly and terminals 74B to 74F projecting upwardly.

The terminals 74A contact with the terminals of the connectors 14A and 14B attached to the wire harnesses W2 and W3. The terminals 74B contact with a part of terminals of the connector 19 (FIG. 1) connected to the electric lower lines 15. The terminals 74C and 74D contact with the terminals 9A and 10A of the relay 9 and 10. The terminals 74E contact with the terminal section 62b of the electronic unit 6. The terminals 74F are connected to a diode 75 (FIGS. 6A and 7). Each of the terminals 74A to 74F is united to any one of the bus bars 74.

In the circuit diagram shown in FIG. 7, all wirings in the junction block 7 are constituted by any one of the bus bars 74. The bus bars 74 constitute a wiring A which connects the terminals 74A to the terminals 74B and 74D; a wiring which connects the terminals 74A to the terminals 74C a wiring C which connects the terminals 74A to the terminals 74C, 74D, and 74F; a wiring D which connects the terminals 74A to the terminals 74E; a wiring E which connects the terminals 74A to the terminals 74B, 74C, and 74D; a wiring F which connects the terminals 74B to the terminals 74D and 74E; a wiring G which connects the terminals 74C to the terminals 74E; a wiring H which connects the terminals 74D to the terminals 74E; and a wiring I which connects the terminals 74E to the terminals 74F.

Each of the terminals 74A is formed by bending an end of the bus bar 74 downwardly. The terminals 74A penetrate through the bottom wall of the lower housing 71 and project inwardly from the attaching portion 72b with the junction body 72 being put in the lower housing 71.

Also, each of the terminals 74B to 74F is formed by bending upwardly the other end of the bus bar 74 constituting the wirings A to D and an end of the bus bar 74 constituting the wirings F to I. The distal end of each terminal constituting the terminals 74C to 74F is connected to each of contact members 74Ca to 74Fa (FIGS. 4A to 6A). The terminals 74E are provided opposite to the aperture 71C in the lower housing 71.

Figure 3A:
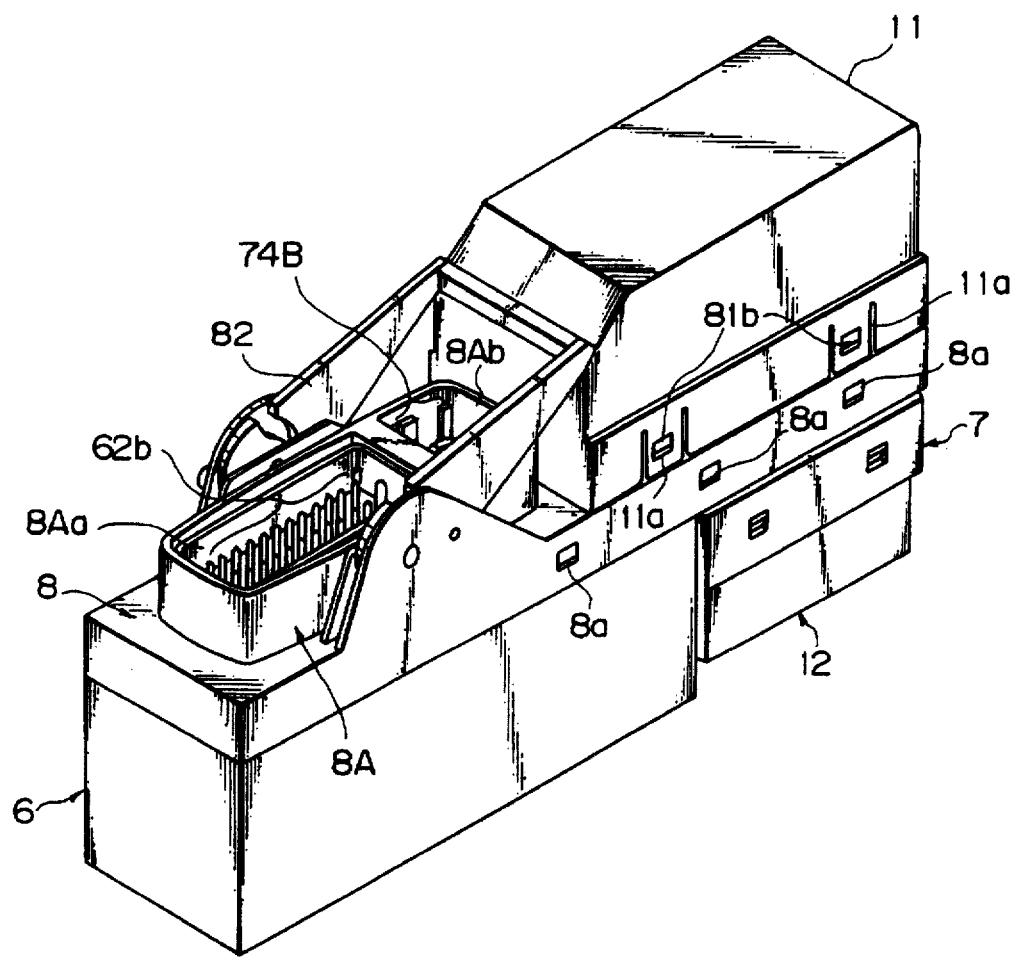
FIGS. 3A and 3B are perspective views of the antilock brake systems shown in FIG. 1 but the hydraulic unit is removed.
Figure 3B:
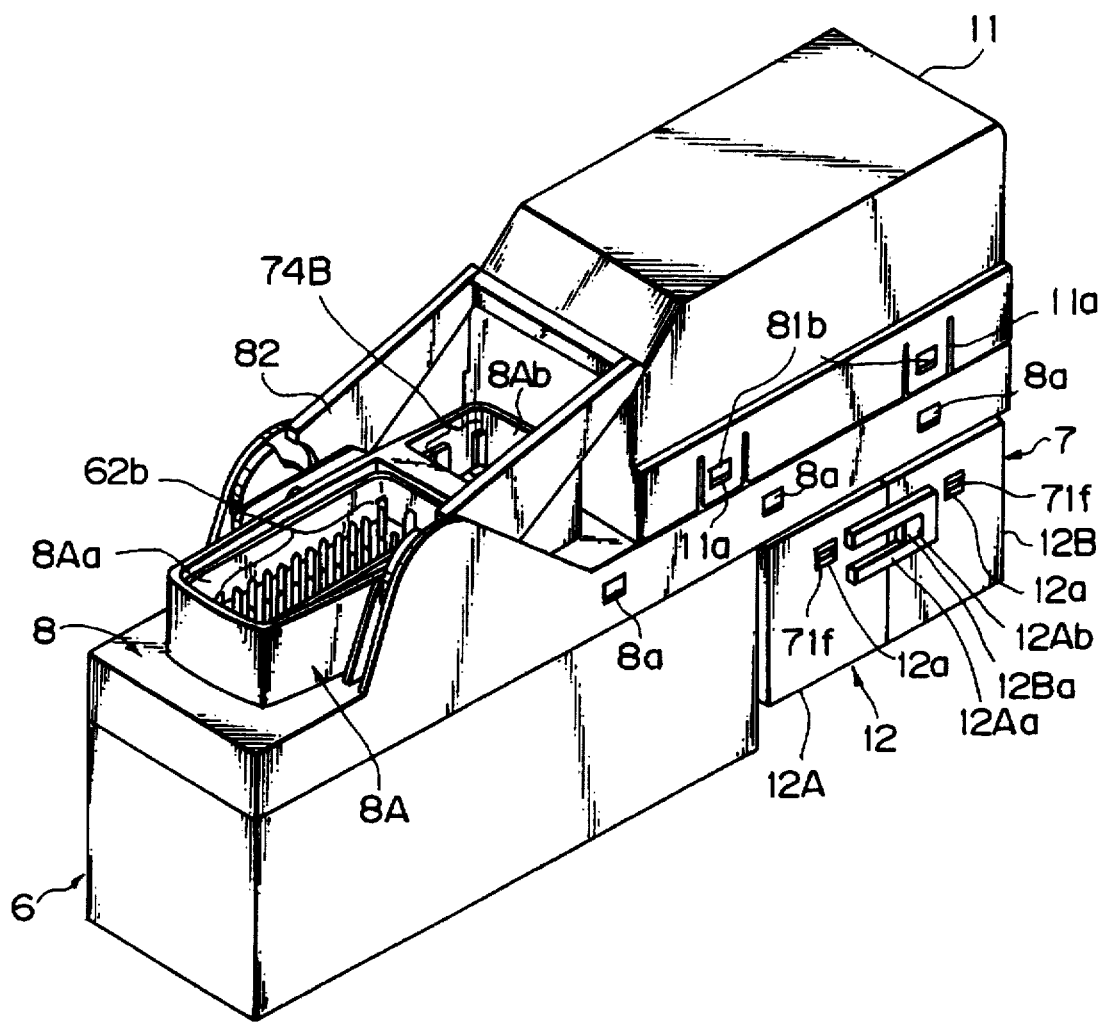

The upper housing 8 serves as a common upper housing for the electronic unit 6 and the junction block 7. The upper housing 8 is provided on the side wall with a recess 8a which engages with the first projection 71e on the lower housing 71. The upper housing 8 is put on the lower housing 71, which accommodates the junction body 72, so that the upper end face of the lower housing 71 is closed. Thus, the upper housing 8 is coupled to the lower housing 71 with the first projection 71e being engaged with the recess 8a (FIG. 3A).

The connector socket 8A for the connector 19 is integrally formed on the front side rather than the center in the upper housing 8. The connector socket 8A defines a space 8Aa in which the terminal sections of the electronic unit 6 are disposed and a space 8Ab for connecting the junction block 7. The upper housing is provided on the rear side rather than the center with a trapezoidal mount 81 on which the relays 9, 10, the sockets 8B, 8C and the connector 8D for the diode 75 are formed.

The mount 81 is provided with a cylindrical guide 81a through which the gel-pouring pipe 71d in the lower housing 71 passes. The mount 81 is provided on the side face with a projection 81b. Further, the upper housing 8 is provided with a groove 8b, with which the projection 61a of the lower housing 61 mates, on the lower end periphery of one side corresponding to the connector socket 6A (FIG. 8A).

The upper housing 8 is provided with a U-shaped lever 82 which is rotatably mounted on the opposite sides of the connector socket 8A. The lever 82 serves to maintain the connector 19 in the mounted position by turning the lever 82 from the position shown by a two dot chain line in FIG. 8A to the position shown by a full line in FIG. 6A after mounting the connector 19 on the connector socket 8A. That is, the lever 82 maintains the connector 19 in the mounted position by pushing down pins 20a provided on the opposite sides of a connector cover 20 to be put on the connector 19 from the position shown by the two dot chain line to the position shown by the full line in connection with turning of the lever 82 and by maintaining this position.

Under the united position of the upper housing 8 and the lower housing 71, the terminals 74b of the junction body 72 are opposited to the, space 8Ab of the connector socket 8A, the terminals 74C and 74D to the sockets 8B and 8C, and the terminals 74F to the connector 8D.

The relays 9 and 10 include downwardly extending terminals 9A and 10A. Lower ends of housing of the relays 9 and 10 are mated with the sockets 8B and 8C. Then, the terminals 9A and 10A are inserted into the interior of the upper housing.

A relay cover 11 is a box with an opening on the bottom. The lower portion of the relay cover 11 is mated with the mount 81 of the upper housing 8. The relay cover 11 is provided on the lower end with an elastic portion 11a in which an aperture 11b is formed so that the projection 81b on the mount 81 engages with the aperture 11b.

The connector cover 12 is formed into a polygonal cylinder with open opposite ends. The connector cover 12 encloses the connectors 14A and 14B by mounting the upper end of the connector cover 12 on a connector attaching portion 71b formed on the lower housing 71 of the junction block 7 after coupling the connectors 14A and 14B to the Connector attaching portion 71b. The connector cover 12 is provided with a plurality of engaging holes 12a on the upper peripheral wall. When the connector cover 12 is mounted on the connector attaching portion 71b, second engaging projections 71f formed on the connector attaching portion 71b are mated in the engaging holes 12a.

In the antilock brake system described above, the electronic unit 6 is coupled to the upper housing 8 and lower housing 71 by inserting the projections 61a of the electronic unit 6 through an adhesive having a sealing function (not shown) into the grooves 8b and 71g in the upper housing 8 and the lower housing 71 after the upper housing 8 is mounted on the lower housing 71 of the junction block 7. In this position, the terminals 74B of the junction body 72 are disposed in the space 8Ab in the connector socket 8A of the upper housing 8, the terminals 74C and 74D are disposed below the sockets 8B and 8C, and the terminals 74F are disposed on the inner side of the connector 8D for diode. At the same time, the connector 62b of the electronic unit 6 is disposed in the space 8Aa in the connector socket 8A of the upper housing 8.

Thus, an insulation gel such as silicone gel or the like is filled in the lower housing 61 of the electronic unit 6 through the gel-pouring pipe 71d provided in the lower housing 71. This insulation gel serves as a water-proofing and vibration-proofing agent.

The relays 9 and 10 are mounted on the sockets 8B and 8C of the upper housing 8 coupled to the lower housing 71, thereby contacting the terminals 9A and 10A which extend in the upper housing 8 with the respective terminals 74C and 74D.

The above assembly combining the electronic unit 6 and the junction block 7 is united to the hydraulic power unit 5 by attaching the lower housing 61 of the electronic unit 6 to the base 53 by means of bolts (not shown). Also, the solenoid valves 5a to 5d, the motor and the like in the hydraulic power unit 5 are electrically connected to the terminals 74A of the junction block 7 by coupling the connectors 14A and 14B attached to the wire harnesses 13A and 13B connected to the valves, the motor and the like to the connector attaching portion 71b of the lower housing.

The hydraulic power unit 5 together with the united electronic unit 6 and junction block 7 are arranged at the same position as that of the hydraulic power unit 105 in the prior antilock brake system.

Since the electronic unit 6 and junction block 7 can be provided on the side of the hydraulic power unit 5 in the above antilock brake system, it is possible to easily meet different layouts in the engine compartment depending upon the kind of automobile by merely extending the base 53 of the hydraulic power unit 5 in a direction opposite to that in FIG. 1. In this case, the base 53 may be beforehand extended to the opposite sides of the hydraulic power unit 5, thereby enhancing general use of the antilock brake system.

Figure 8:
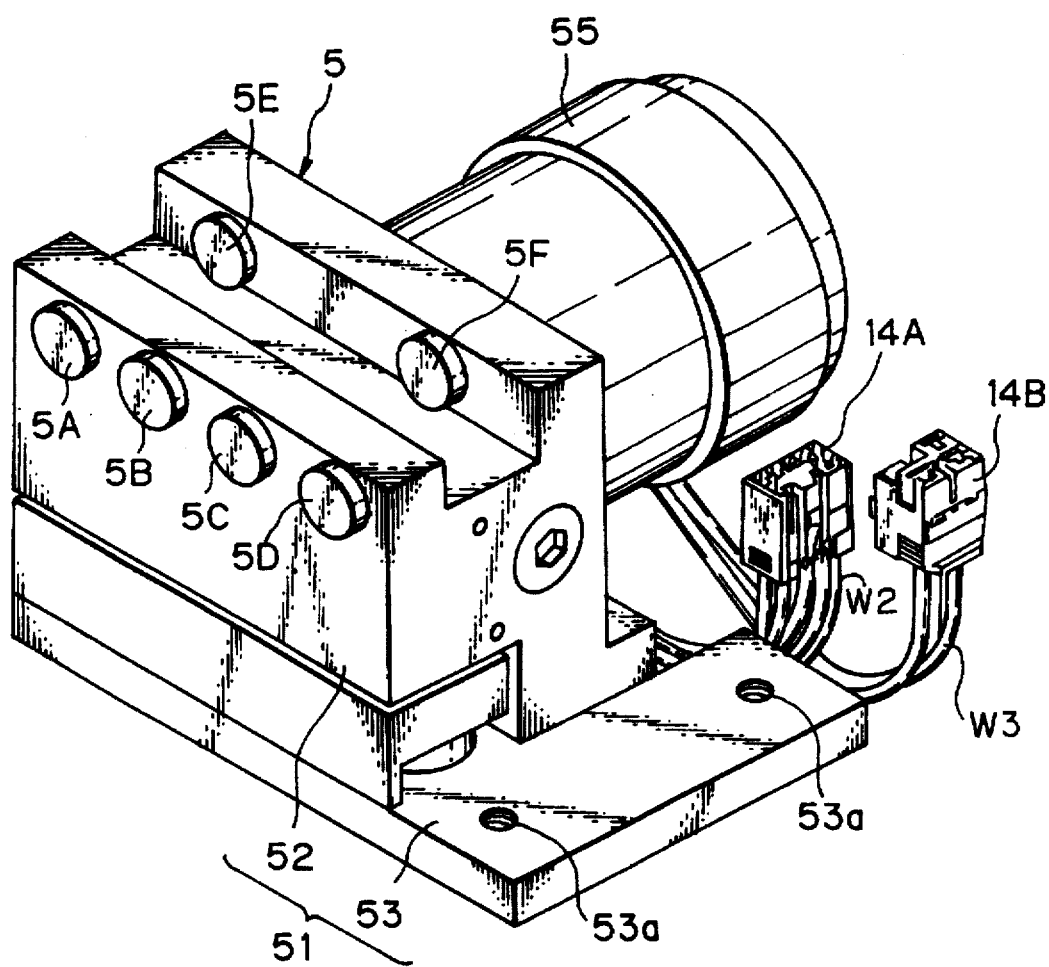
FIG. 8 is a perspective view of the hydraulic unit.

It is possible to avoid the electronic unit or the junction block 7 from impeding the pipes to be connected to the coupling ports for brake fluid disregarding the direction of the ports, if the electronic unit 6 and junction block 7 are provided on the opposite sides of the hydraulic power unit 5, although the coupling ports for brake fluid 5A to 5F are provided on the front face of the hydraulic power unit 5 as shown in FIG. 8. The hydraulic power unit shown in FIG. 8 is given the same signs as those in FIG. 2 to the positions corresponding to those of the hydraulic power unit 5 in FIG.

It is not necessary to provide a wire harness between the engine compartment and the car interior even if the above antilock brake system is disposed in the automobile, since the junction block 7 to be united to the hydraulic power unit 5, electronic unit 6, relays 9, 10, and diode 75 are arranged in the engine compartment and the bus bar 74 in the junction block 7 interconnects the hydraulic power unit 5, electronic unit 6, relays 9, 10, and diode 75, respectively.

Further, it is not necessary in the above aspect to interconnect the relays 9, 10 and the hydraulic power unit 5 or the relays 9, 10 and the electronic unit 6, since the relays 9, 10 are connected to the terminals 74C and 74D in the junction block 7 by mounting the relays 9, 10 on the sockets 8B and 8C in the upper housing 8. Accordingly, it is possible to simplify the harness-working.

According to the above aspect of the present invention, an enlargement of the car interior is not limited on account of the provision of the antilock brake system since the electronic unit and the other parts which constitute the antilock brake system are disposed in the engine compartment. Further, since the solenoids in the hydraulic power unit are connected to the junction block united to the electronic unit, it is not necessary to provide a wire harness for the antilock brake system between the engine compartment and the car interior. Accordingly, it is possible to simplify the harness-working and to enhance production efficiency in comparison with the prior art.

In addition, the electronic unit and the junction block do not impede an arrangement of pipes for brake fluid to be connected to the coupling ports.

It is possible to electrically connect the first and second connector relays, and electronic unit to the electrical wiring sections of the junction block only by mechanically coupling the connectors, relays and electronic unit to the junction block.

It is also possible to enhance a flexibility of layout in the engine compartment since the electronic unit and junction block can be provided on any side of the hydraulic power unit in accordance with the layout in the engine compartment.

A second aspect of the present invention will be explained below by referring to FIGS. 1 to 8. Since the second aspect is substantially the same as the first aspect with respect to the basic construction, only features particular to this aspect are explained briefly.

The electric power source circuits 16 and 17 connected between the battery 21 and the electronic unit 6 and junction block 7 constitute a part of a second electrical circuit CK2, together with the signal supply lines 15 and ground lines 18. The signal supply lines 15, electric power lines 16, 17 and ground lines 18 which constitute the second electrical circuit CK2 are formed into a single wire harness W1 (FIG. 1). The connector 19 is connected to the distal end of the wire harness W1.

As described above, the second electrical circuit CK2 is constructed by the rotation detectors 1 to 4 and the signal supply lines 15 which interconnect the detectors 1 to 4 and the electronic unit 6, together with the electric power source lines 18, 17 and the ground circuit 18, which is connected to the printed circuit plate 62.

The terminal sections 62a and 62b are mechanically connected to the base support 63. The terminal sections 62a and 62b are connected to external terminals on the printed circuit plate 62. The terminal section 62a is constituted of terminals adapted to contact with terminals 74E in the junction block 7. The terminal section 62b is constituted by terminal adapted to contact with contact pieces corresponding to the signal supply lines 15 of the sensors 1 to 4, electric power lines 17 and earth lines 18 which constitute a part of the second electrical circuit CK2. The terminal section 62b is disposed in the space 8Aa in the connector socket 8A in the upper housing 8 with the electronic unit 6 being fixed in the upper housing 8 and junction block 7. The terminal section 62b corresponds to a first set of terminals in the present invention.

The terminals 74B contact with the terminals of a part of the connector 19 (FIG. 1), namely the terminals connected to the electric power line 16. That is, the terminals 74B is disposed in the space 8Ab in the connector socket 8A in the upper housing 8 with the upper housing 8 being mounted on the junction block 7.

As described above, the relays 9 and 10 have terminals 9A and 10A which extend downwardly, respectively. The lower ends of the housings of the relays 9 and 10 engage with the socket portions 8B and 8C of the upper housing 8, so that the terminals 9A and 10A enter into the upper housing 8. The relays 9 and 10 constitute a part of a first electrical circuit CK1.

Thus, the electronic unit 6 is united to the junction block 7. However, the connector socket 8A is still not coupled to the connector at this time. In this position, the lower housing 61 of the electronic unit 6 united to the junction block 7 is attached to the base 53 by bolts (not shown) so that the electronic unit 6, together with the junction block 7, are united to the hydraulic power unit 5. The solenoid valves 5a to 5d of the hydraulic power unit 5 and the motor 55 are electrically connected to the terminals 74A of the junction block 7 by coupling the connectors 14A and 14B attached to the wire harnesses W2 and W3 connected to the valves and motor to the connector attaching portions 71b of the lower housing 71.

The electronic unit 6 united to the junction block 7, together with the hydraulic power unit 5, are disposed in the engine compartment. Then, by connecting the connector 19 coupled to the distal end of the wire harness W1 to the connector socket 8A on the upper housing 8, the electric power lines 16 to be connected to the battery 21 is connected to the terminals 74B of the junction block 7 while the signal supply lines 15 to be connected to the sensors 1 to 4, the electric power lines 17 to be connected to the battery 21, and the ground lines 18 are connected to the terminal section 62b of the electronic unit 6.

In addition, in the above assembly uniting the electronic unit and the junction block, the signal supply lines 15, electric power lines 17, and ground lines 18 which constitute a part of the second electrical circuit CK2 are directly connected to the terminal section 62b of the electronic unit 6. That is, the signal supply lines 15, electric power lines 17, and ground lines 18 are not connected through junction block. 7 to the electronic unit 6. Accordingly, even if the number of the lines 15, 17, and 18 is changed, the junction block 7 per se can be used as it is.

According to the second aspect of the present invention, it is possible to simplify a wiring-work of a wire harness which constitutes an electrical circuit and to thereby enhance production efficiency.

Even if the electronic unit is disposed in the engine compartment, a complicated circuit network including wires is not concentrated around the electronic unit and thus the wiring-work of the harness can be simplified.

Also, since a part of the second electrical circuit is directly connected to the electronic unit, the junction block can be used as it is and a common use of the junction block can be widened, even if a design of the second electrical circuit to be directly connected to the electronic unit is changed.

A third aspect of the present invention will be explained below by, referring to FIG. 9.

Figure 9:
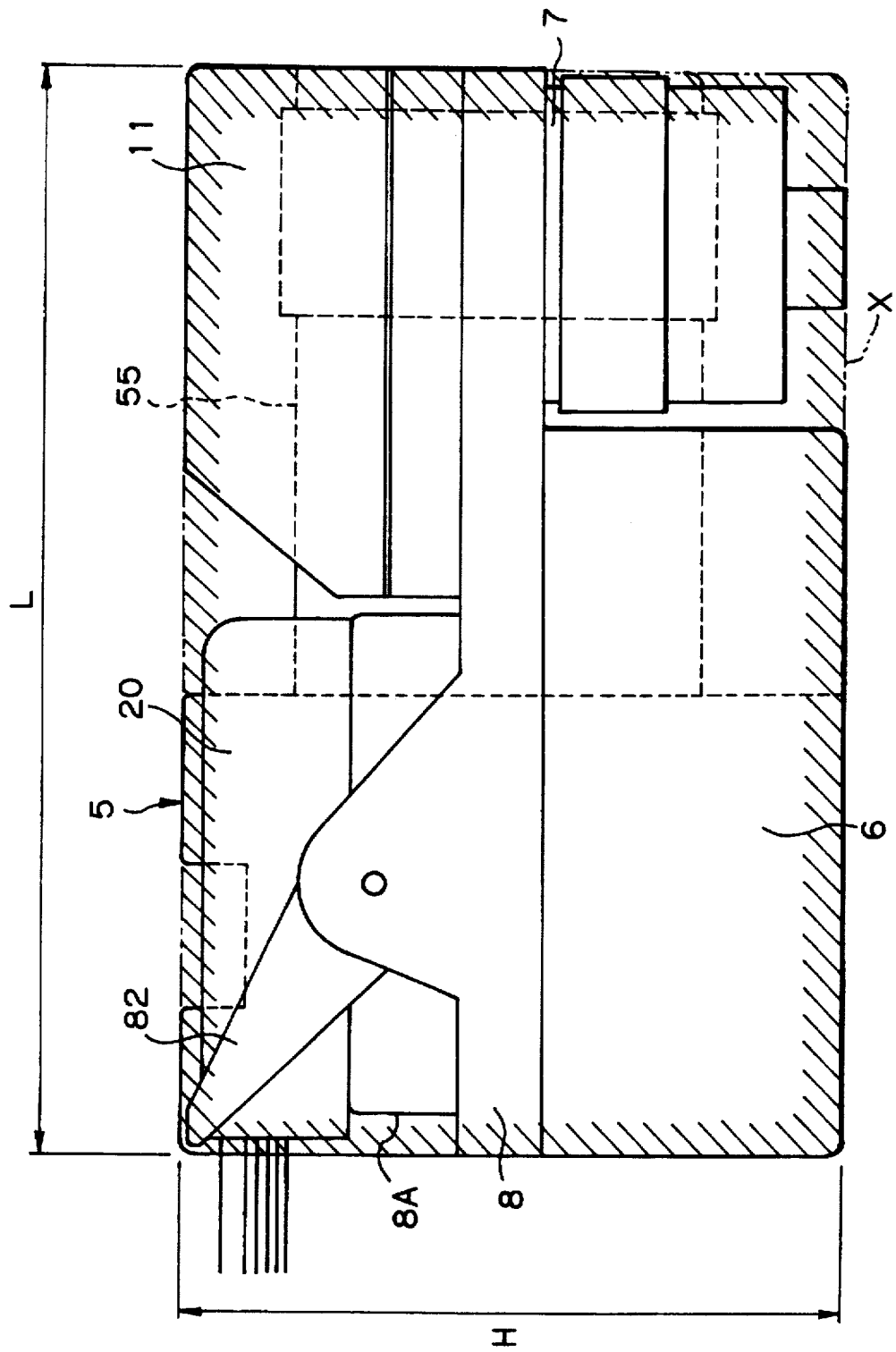
FIG. 9 is a side view of FIG. 1.
Figure 10:
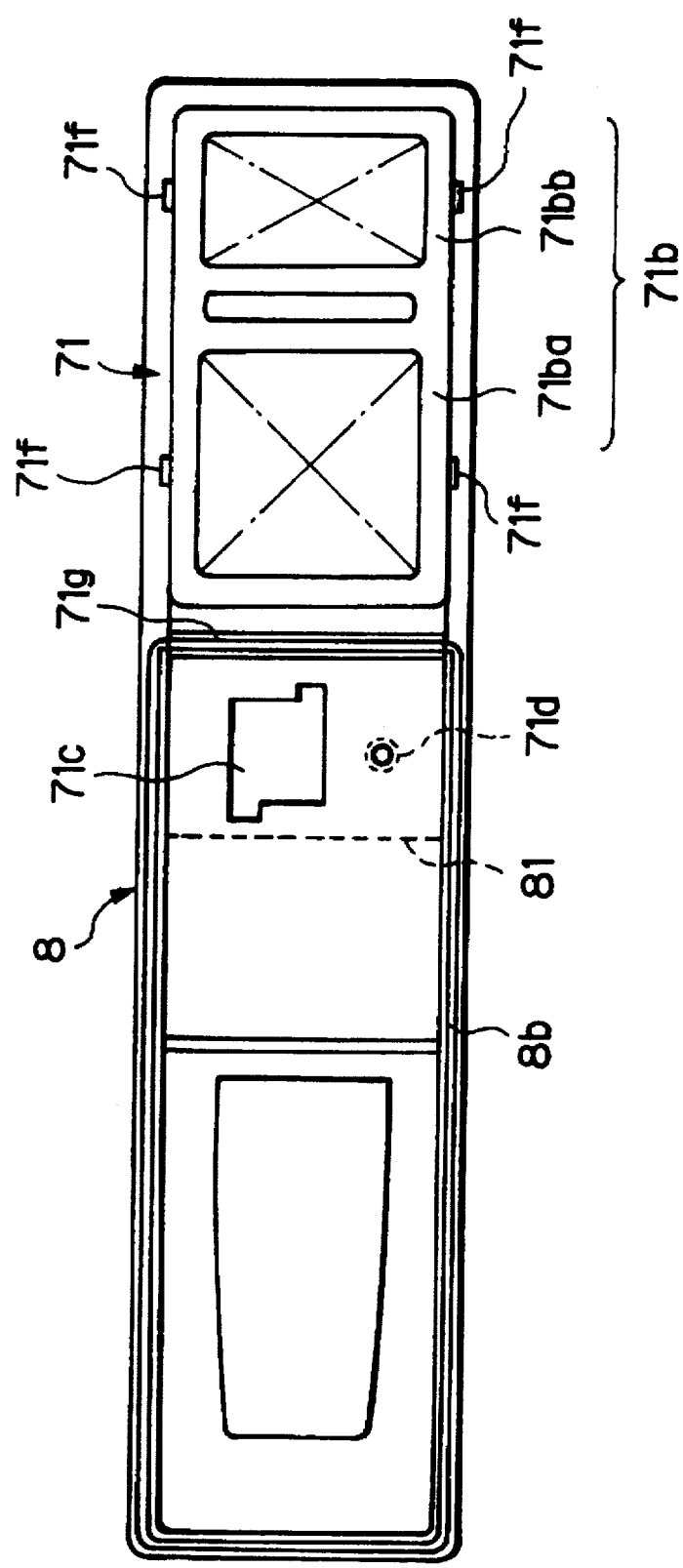
FIG. 10 is a bottom side view of a connector mounting portion.

In this aspect of the anti-lock brake system, as shown in FIG. 9, the side faces of the electronic unit 6 and junction block 7 united on the hydraulic power unit 5 are projected on a rectangular plane X defined by the maximum height H and depth L of the hydraulic power unit 5. That is, the electronic unit 6 and junction block 7 are united on the hydraulic power unit 5 and thus this widens only in the widthwise direction the space defined by the conventional hydraulic power unit 5. Accordingly, it is possible to significantly reduce a projection plane area of the electronic unit 6 when the printed circuit plate 62 is supported vertically with respect to the plate direction.

According to this aspect of the present invention, it is possible to suppress an increase of a ratio of the electronic unit to an opening area of the engine compartment although the electronic unit is disposed in the engine compartment, since the projection plane area of the electronic unit can be reduced. Further, it is possible to compact the united assembly including the hydraulic power unit, electronic unit and junction block since the electronic unit and junction block do not protrude from the heightwise and depthwise directions of the hydraulic power unit.

Next, a fourth aspect of the present invention will be explained below by referring to FIGS. 1 to 8. As the fourth aspect is substantially the same as the first aspect with respect to the basic construction, features particular to this aspect between them will be mainly explained below.

The printed circuit plate 62 is secured to the base support 63. The first terminal section 62a and the second terminal section 62b are attached to the base support 63. The terminal sections 62a and 62b are connected to the external terminals on the printed circuit plate 62 and disposed above the plate 62. The first terminal section 62a includes terminals which contact with the terminals 74E of the junction block 7. The second terminal section 62b includes terminals corresponding to the signal supply line 15 of the sensors 1 to 4. The second terminal section 62b is disposed in the space 8Aa in the connector socket 8A on the upper housing 8 with the electronic unit 6 being fixed in the upper housing 8 and the junction block 7.

The printed circuit plate 62 projects upwardly at the portion corresponding to the second terminal section 62b, so that a position H2 of the upper end side corresponding to the second terminal section 62b is higher than a position H1 of the upper end side corresponding to the first terminal section 62a. The printed circuit plate 62 together with the base support 63 are unmovably accommodated in the lower housing 61. However, in this position, an upwardly projecting portion corresponding to the second terminal section 62b is disposed outside the lower housing G1.

The insulation gel 64 is filled in a space defined by the lower housing 61, lower housing 71, and upper housing 8 so that the printed circuit plate 62 is embedded in the gel 64. The insulation gel 64 is made by solidifying a silicon sol at the normal temperature. The silicon sol poured into the electronic unit 6 after the electronic unit 8 is united to the junction block 7.

The lower housing 71 defines an upwardly open space 71a adapted to accommodate the junction block by a side wall 71A and a bottom wall 71B (FIG. 4A). A height of the space 71a is set to be greater than a height of the junction body 72 mounted on the bottom plate 71B. At the same time, an upper side of the side wall 71A defining the space 71a is set to be higher than a position H2 of an upper end side of the printed circuit plate 82 at the position corresponding to the second terminal section 82b, when the lower housing 61 of the electronic unit 8 is coupled to the lower housing 71. In the case that there are any steps on the upper side of the side wall 71A, the lowest position of the steps is set to be higher than the position H2 of the upper end side of the printed circuit plate 62.

Figure 5A:
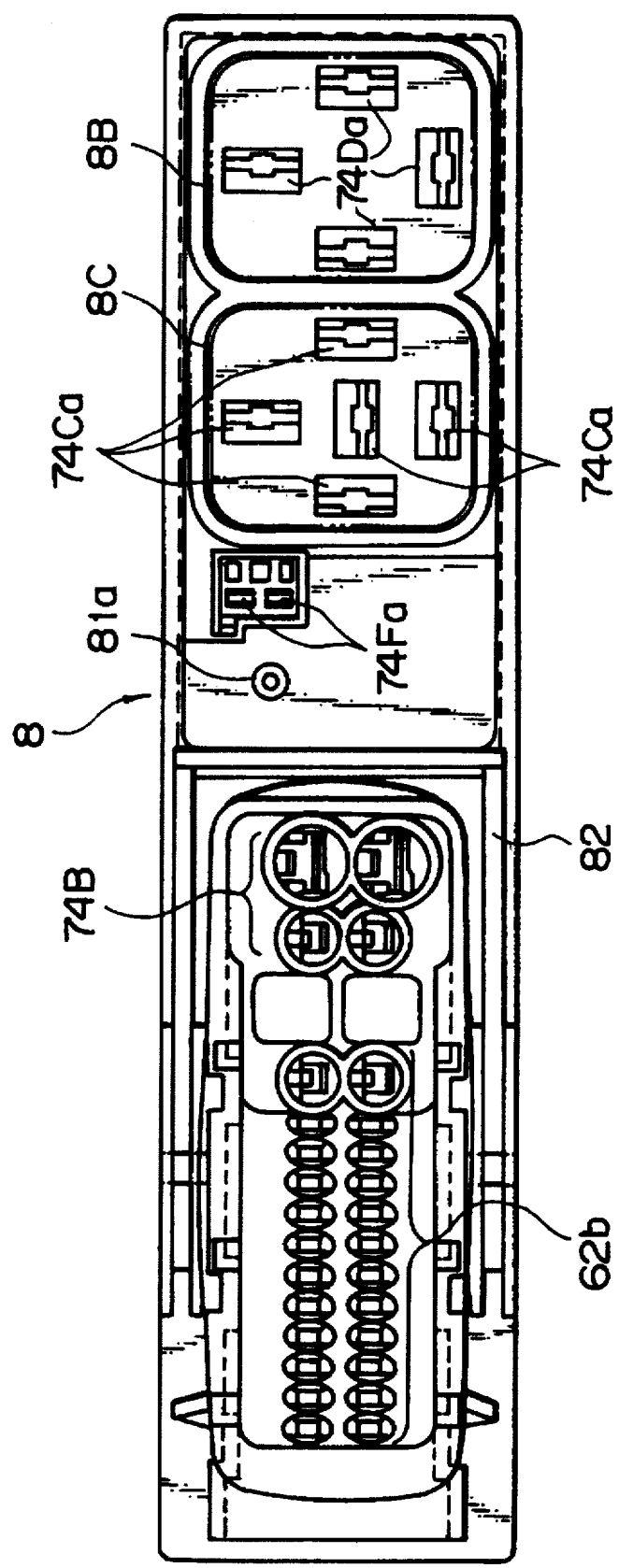
FIGS. 5A and 5B are plan views of FIGS. 3A and 3B
Figure 5B:
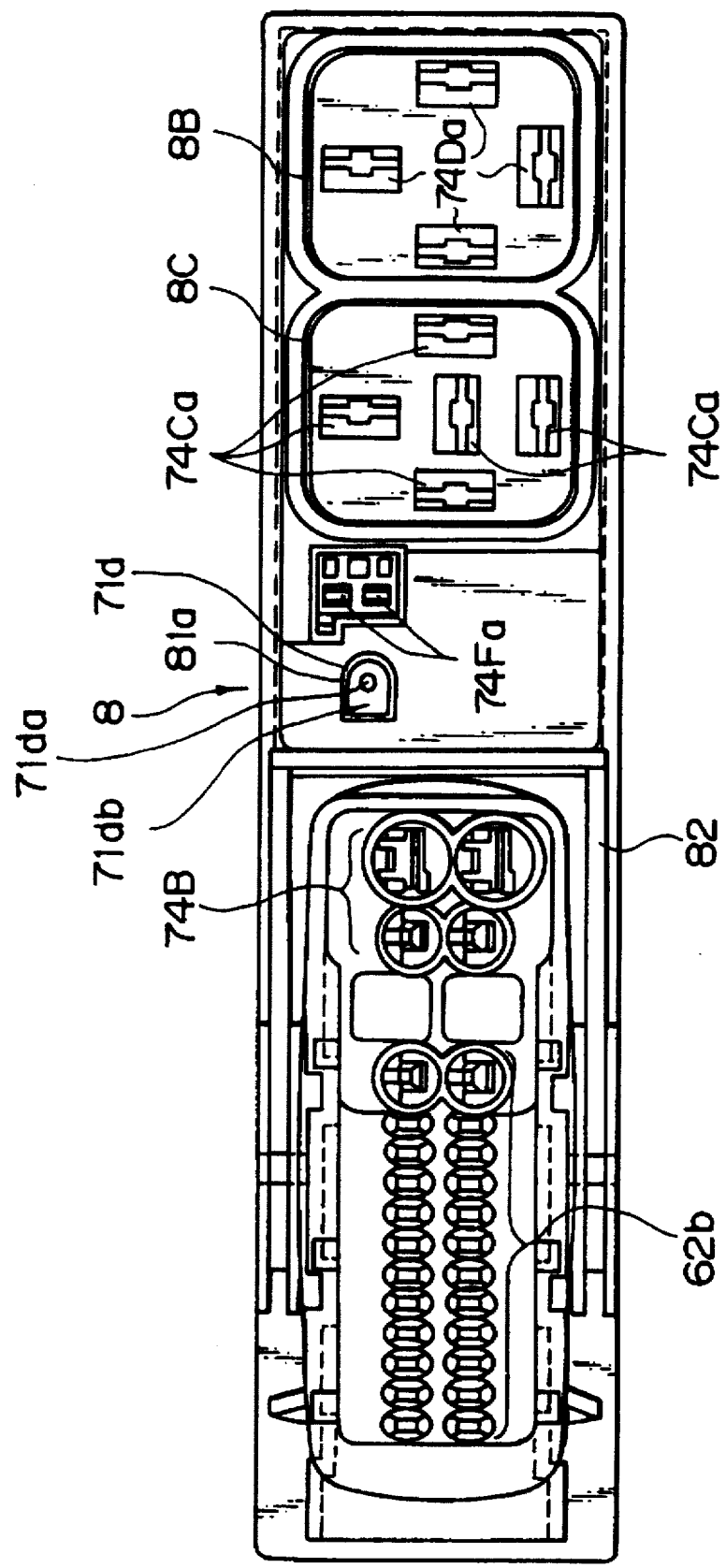

Also, as shown in FIG. 5B, the lower housing 71 is provided with a sol-pouring pipe 71d adjacent to the aperture 71c on the lower housing 71. The sol-pouring pipe 71d is provided with a pouring passage 71da and an air vent passage 71db parallel to the passage 71da. However, the air vent passage 71db may be omitted. The pouring passage 71da serves to guide the sol into the lower housing 61 of the electronic unit 6. The air vent passage 71da serves to vent air from the interior of the electronic unit 8 during pouring the sol from the pouring passage 71da into the electronic unit 6. The pouring passage 71d extends upwardly through the upper housing 8 with the upper housing 8 being mounted on the lower housing 71.

The relay cover 11 is a downwardly opening box. The lower end portion of the relay cover 11 engages with the mount 81 on the upper housing 8 so that the relay cover 11 is mounted on the upper housing 8. The relay cover 11 is provided with a resilient portion 11a on the lower end. An engaging aperture 11b which engages with a protrusion 81b on the mount 81 is formed in the resilient portion 11a. Also, a rod 11c stands on the inner peripheral wall of the relay cover so that the distal end of the rod 11c chokes the pouring port 71da when the relay cover 11 is mounted on the upper housing 8. Further, a plurality of projections 11d is formed on the inner peripheral wall so that the projections 11d abut on or extend near the upper ends of the relays 9, 10 and diode connector 8D when the relay cover 11 is mounted on the upper housing 8.

An insulation sol such as a silicone sol or the like is poured into the lower housing 61 of the electronic unit 6 through the pouring passage 71da in the lower housing 71 after the electronic unit 6 is coupled to the upper housing 8 and lower housing 71. The sol is formed into a gel by, for example, a temperature change or addition of a solution after pouring, thereby filling the housing of the electronic unit 6 with the insulation gel 64 such as a silicone gel. Thus, it is possible to enhance functions of vibration-proof and heat-resistance of the printed circuit plate 62 by filling the electronic unit 6 with the silicone gel. It is also possible to waterproof the printed circuit plate 62 for the same reason.

The silicone gel is poured into the electronic unit to a level corresponding to the height H2 of the upper end side of the printed circuit plate 62 at the position corresponding to the second terminal section 62b as shown by a broken line 84a in FIG. 6A. Thus, the poured sol does not enter into the lower housing 71 of the junction block 7 even if the sol is poured to a level sufficient to immerse the entire printed circuit plate 62 in the sol, since the upper end side of the side wall of the lower housing 71 of the junction block 7 is set to be above the height H2 of the upper end side of the printed circuit plate 62 at the position corresponding to the second terminal section 62b.

If the sol enters into the lower housing 71, the sol is formed into the gel around the terminals 74B, thereby deteriorating a positive contact between external terminals and the terminals 74B. However, in the above electronic unit united to the junction block the above problem does not occur, since the sol is prevented from entering into the lower housing 71. It will be apparent from the foregoing that the electronic unit united to the junction block can immerse in the insulation gel 64 the projection corresponding to the second terminal section 62b in the printed circuit plate 61. This makes it possible to enlarge an area of the printed circuit plate 61.

Although the silicone gel is used as the insulation gel 64 in the above embodiment, another insulation gel such as a PVC paste may be utilized if it has a vibration-proofing function, waterproofing, and heat-resisting function.

According to the above aspect, it is possible to simplify a wiring-work of a wire harness which constitutes an electrical circuit and to thereby enhance production efficiency. Since the printed circuit plate can be positively protected from heat, moisture, vibration and the like, it is possible to maintain reliability of the electronic unit even in an engine compartment in an automobile which is constantly exposed to high temperature, vibration, and possible penetration of rain or water during driving. Also, since it is not necessary to assemble an electronic unit and a junction block with the sol being filled in the electronic unit, production work becomes easy. Further, it is possible to enlarge an area of the printed circuit plate since the printed circuit plate can be immersed in the insulation Eel to a position corresponding to the second terminal section on the printed circuit plate, even if the upper end of the printed circuit plate corresponding to the first terminal section is disposed above the upper end of the printed circuit plate corresponding to the second terminal section. It is possible to simplify assemblies work, since the cover can enclose the electrical element and simultaneously close the sol pouring port when the cover is mounted on the upper housing.

A fifth aspect of the present invention will be explained below by referring to FIGS. 3B, 4B, 8B and 10 to 17. As the fifth aspect is substantially the same as the first aspect with respect to the basic construction, features particular to this aspect are mainly explained below.

Figure 11:
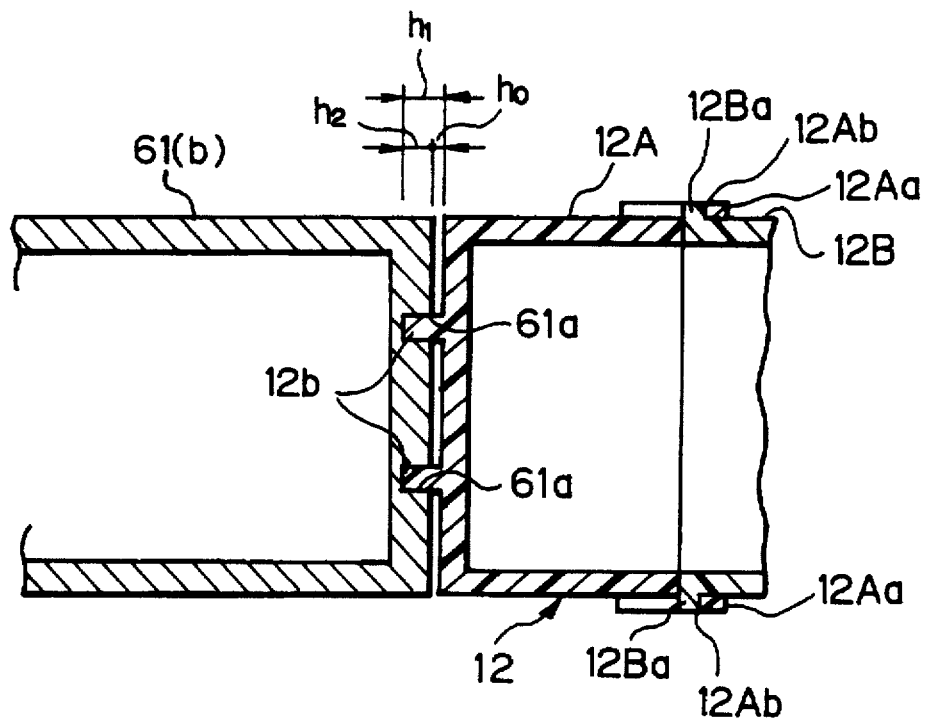
FIG. 11 is a cross sectional view of a main part of a coupling portion of an electronic unit and a connector cover.

The lower housing 61 is made of an aluminum material, in order to shield the printed plate 62 and formed into an upper end open box. The lower housing 61 is adapted to be fixed on the base 53 of the hydraulic power unit 5 by bolts (not shown), as shown in FIG. 1. A pair of guide grooves 61a which extends upwardly from the lower end of the rear face of the lower housing and has a given depth as shown in FIGS. 1(B) and 11. The upper end edge 61b of the lower housing 61 is formed into a projection which is adapted to mate with a groove 71g (FIG. 10) in the lower housing 71 of the junction block V and a groove 8b (FIG. 10) in the lower end periphery on the front side of the upper housing 8.

Figure 17:
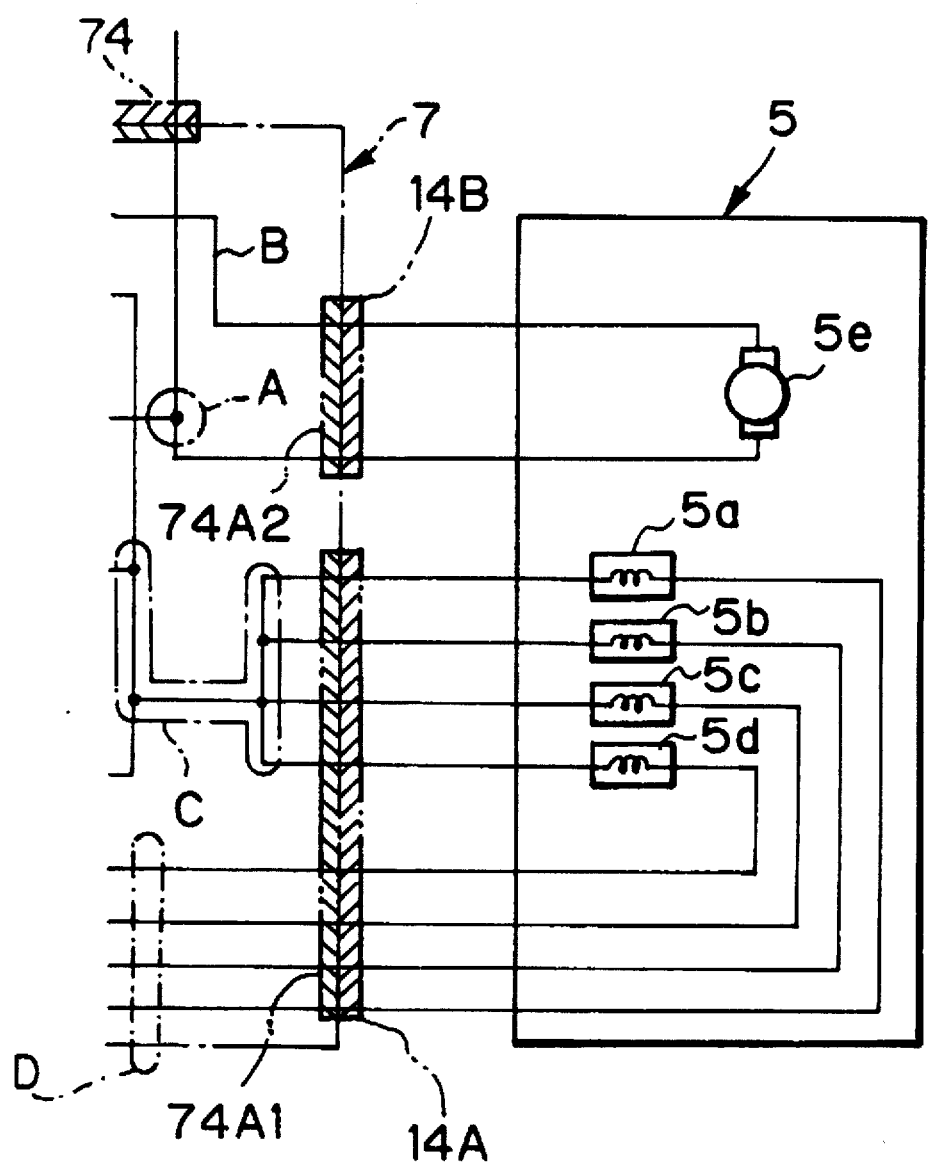
FIG. 17 is a partial electrical diagram of the antilock brake system.

As shown in FIG. 17, each terminal constituting the terminals 74A1 is formed by bending downwardly and end of the bus bar 74 (shown in FIG. 6a) constituting the wirings A and B while each terminal constituting the terminals 74A2 is formed by bending downwardly an end of the bus bar constituting the wirings C and D (shown in FIG. 7). The terminals 74A1 and 74A2 penetrate the bottom wall of the lower housing 71 with the junction body 72 being accommodated in the lower housing 71. The terminals 74A1 projects from the inside of the mounting portion 71ba while the terminals 74A2 projects from the inside of the mounting portion 71bb. The terminals 74A1 and 74A2 contact with the terminals of the connectors 14A and 14B connected to the wire harnesses W2 and W3.

The connector cover 12 comprises a pair of U-shaped cover members 12A and 12B and is formed into a rectangular cylinder with open opposite ends by coupling the members 12A and 12B with each other. One cover member 12A is provided with a resilient piece 12Aa having a recess 12Ab on each side end which the other cover member 12B is provided with a projection 12Ba on each side end. The cover members 12A and 12B are coupled with each other by inserting the projection 12Ba into the recess 12Ab, as shown in FIG. 11.

The connector cover 12 is mounted on the connector attaching portion 71b adjacent to the electronic unit 8 after the connectors 14A and 14B are connected to the connector mounting portions 71ba and 71bb on the lower housing 71 of the junction block 7', so that the connector cover 12 encloses the connectors 14A and 14B. The connector cover 12 is provided with a plurality of apertures 12a on the upper peripheral wall. A second projection 71f formed on a side wall of the connector attaching portion 71b mates with the aperture 12a when the connector cover 12 is attached to the connector attaching portion 71b.

Figure 6B:
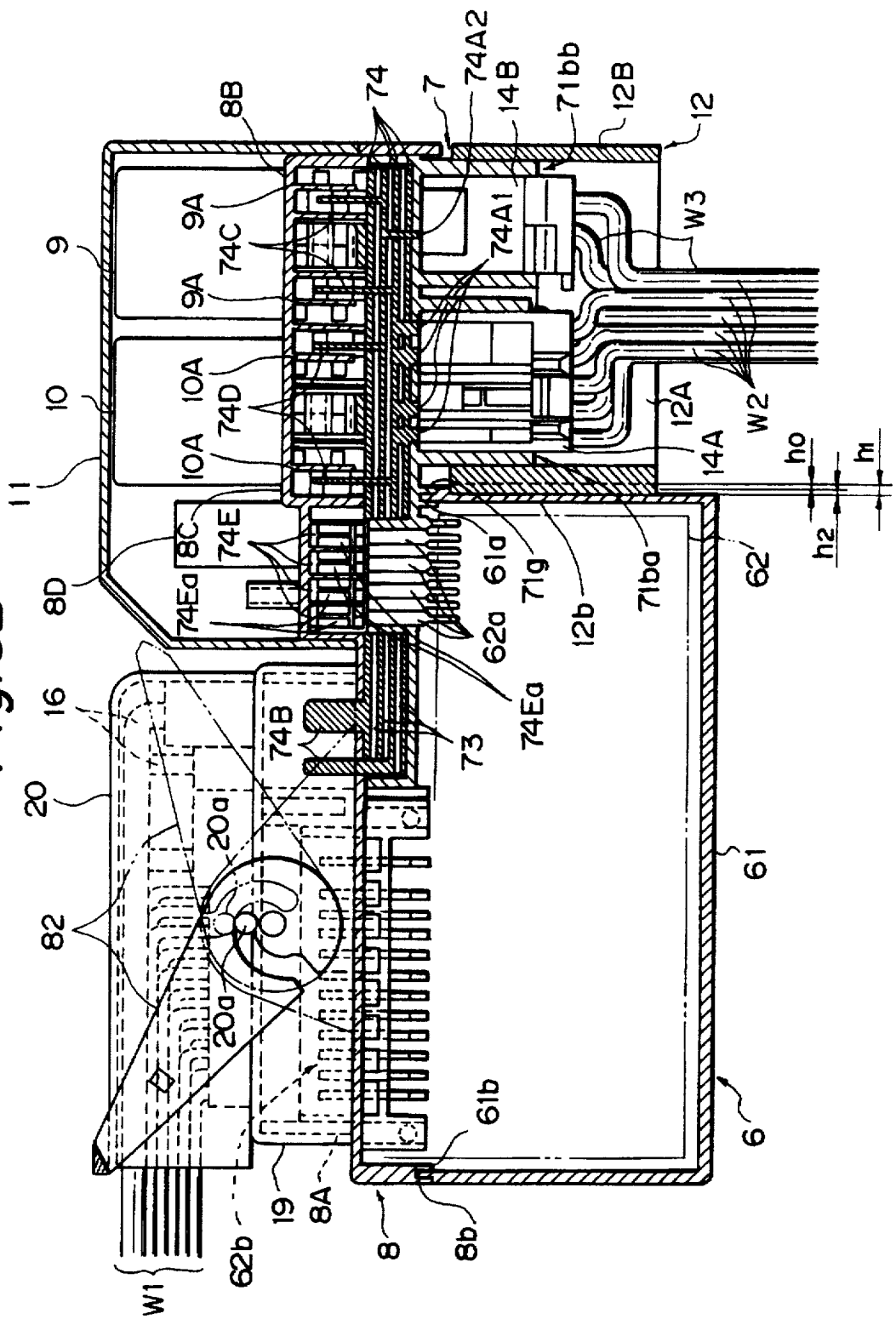

The connector cover 12 is provided with a pair of downwardly extending guide projections on the face opposite to the electronic unit 6. The guide projections engage with guide groove 61a in the electronic unit 6. As shown in FIG. 6B, difference h0 between a height h1 of the guide projection 12b and a depth h2 of the guide groove 61a is equal to a gap between the electronic unit 6 and the connector cover 12.

After the connectors 14A and 14B are coupled to the connector attaching portions 71ba and 71bb, the cover members 12A and 12B are united to form the connector cover 12 with the wire harnesses W2 and W3 being disposed inwardly.

The connector cover 12 is attached to the connector attaching portion 71b with the second projection 71f engaging with the aperture 1ea by sliding the guide projection 12b upwardly while it is fitted in the guide groove 61a.

In the above aspect, the connector cover 12 is coupled to the electronic unit 6 by fitting the guide projection 12b having a rectangular cross section on the connector cover 12 into the guide groove 61a having a rectangular cross section in the lower housing 61 of the electronic unit 6. However, such coupling construction may be changed to those shown in FIGS. 12 to 16.

Figure 12:
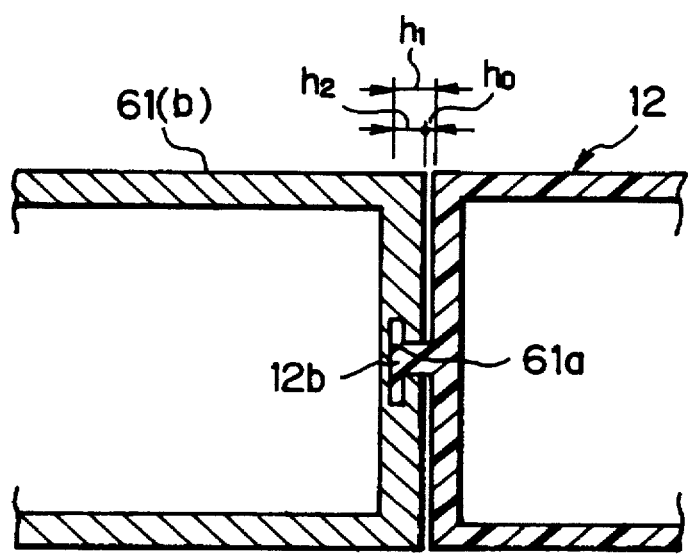
FIG. 12 is a cross sectional view of a main part of another coupling portion of the electronic unit and the connector cover.

FIG. 12 shows an alternative of the coupling construction wherein a guide groove having a T-shaped cross section is formed in the lower housing 61a and a guide projection 12b having a T-shaped cross section.

Figure 13:
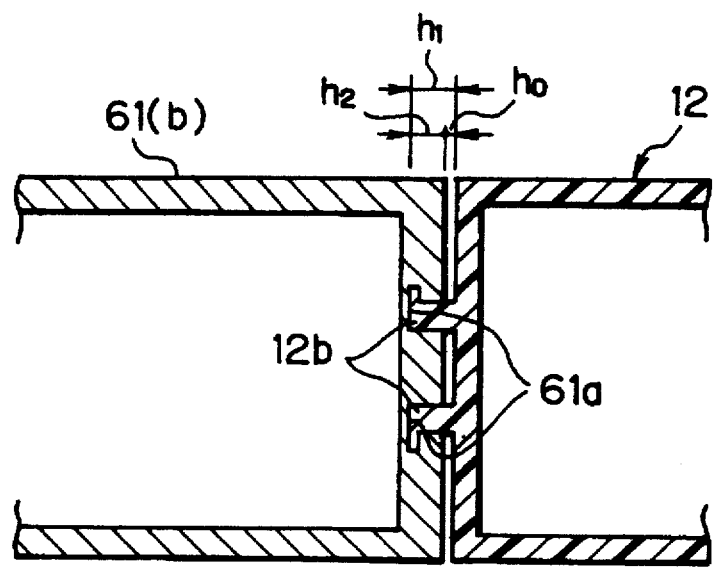
FIG. 13 is a cross sectional view of a main part of still another coupling portion of the electronic unit and the connector cover.

FIG. 13 shows another alternative of the coupling construction wherein a pair of symmetrical guide grooves 61a each having an L-shaped cross section is formed in the lower housing of the electronic unit 6 and a pair of guide projections 61a which are adapted to fit in the grooves 61a are formed on the connector cover 12.

In any cases shown in FIGS. 12 and 13, a difference h0 between a height h1 of the guide projection 12b and a depth h2 of the guide 61a is equal to a gap between the electronic unit 6 and the connector cover 12 by the same manner as the guide projection 12b and guide groove 61a in the fourth embodiment.

Figure 14:
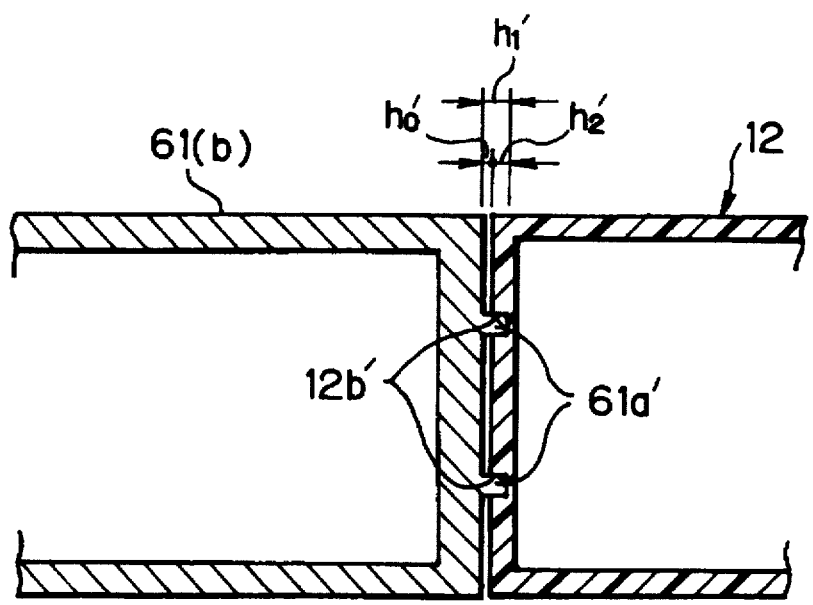
FIG. 14 is a cross sectional view of a main part of still another coupling portion of the electronic unit and the connector cover.
Figure 15:
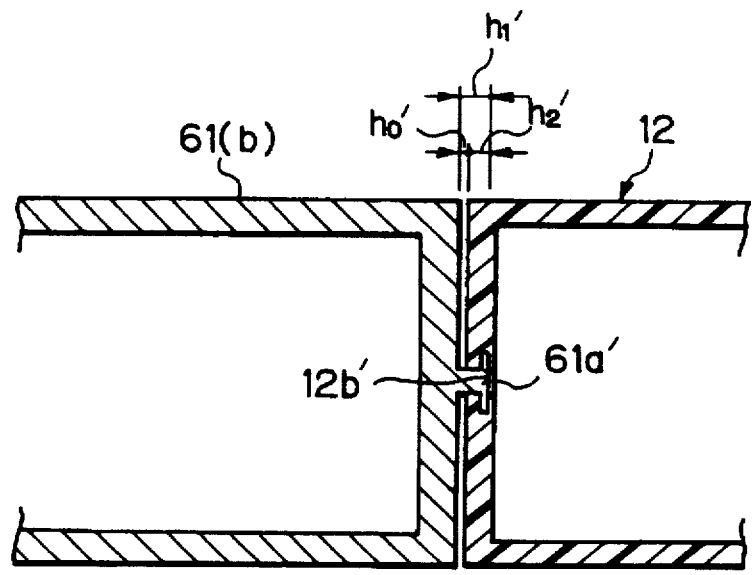
FIG. 15 is a cross sectional view of a main part of still another coupling portion of the electronic unit and the connector cover.
Figure 16:
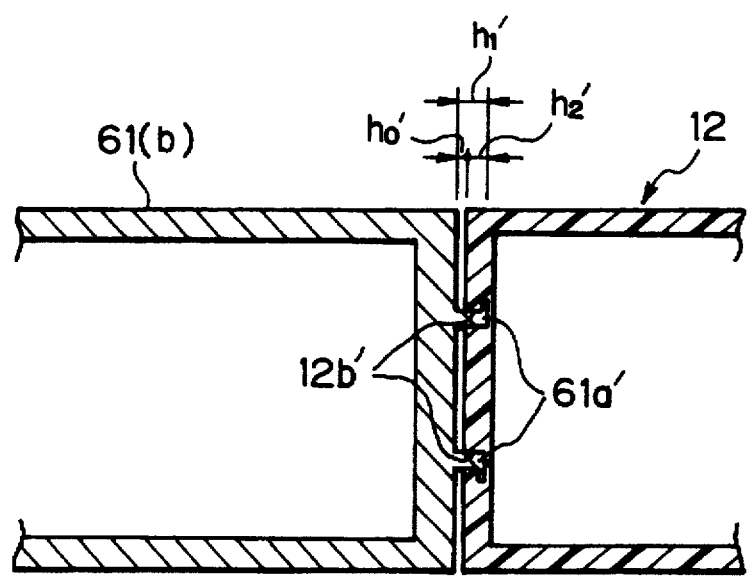
FIG. 16 is a cross sectional view of a main part of still another coupling portion of the electronic unit and the connector cover.

FIGS. 14 to 16 show still another alternative of the coupling construction wherein a guide projection 61a is provided on the lower housing 61 of the electronic unit 6 and a guide groove 12b is provided on the connector cover 12.

It will be apparent from the drawings that the coupling construction shown in FIG. 14 is reversed from that shown in FIG. 11 with respect to cross sections of the projection and groove. Also, the coupling construction shown in FIG. 15 is reversed from that shown in FIG. 12. Further, the coupling construction shown in FIG. 16 is reversed from that shown in FIG. 13. In any cases of the coupling constructions shown in FIGS. 14 to 16, a difference h0 between a height h1' of the guide 61a'. Accordingly, even if the connector cover 12 is mounted near the electronic unit 6, noise will not be generated by a contact between the connector cover 12 and the electronic unit 6 due to vibrations in the automobile.

In the above embodiments having the coupling constructions with the T and L-shaped cross sections shown in FIGS. 12, 13, 15 and 16, it is possible to easily and positively guide the connector cover 12 to the connector attaching portion 71b and to fix the gap between the electronic unit 6 and the connector cover 12 to be the differences "h0" and "h0'".

According to the above aspect, since it is always possible to ensure that the gap between the electronic unit and the connector cover to be more than a given distance, contact between the electronic unit and the connector cover can be avoided, thereby compacting the united junction block and electronic unit, even if the connector cover which encloses the connector connected to the connector socket of the junction block approaches the electronic unit.

Finally, a sixth aspect of the present invention will be explained below by referring to FIGS. 1, 6C and 18 to 24. The sixth aspect is substantially the same as the first aspect with respect to the basic construction. Accordingly, features particular to this aspect will be mainly explained.

The electronic unit 6 includes the lower housing 61, the printed circuit plate 62, the first connector 62a, the second connector 62b, and a heat-radiation member 63.

Figure 22:
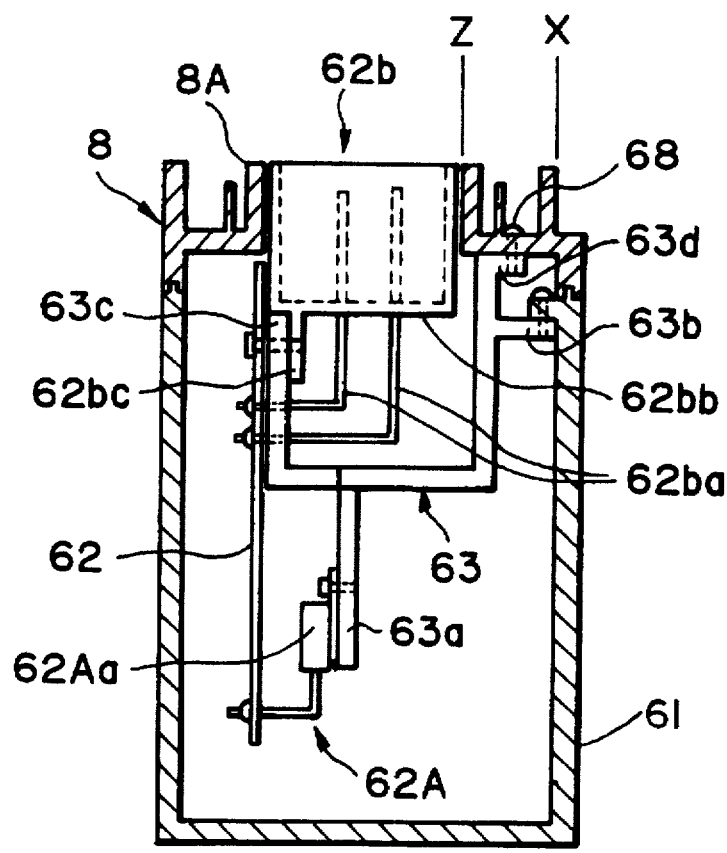
FIG. 22 is a schematic cross sectional view of a printed circuit plate accommodating unit illustrating a step of assembling the unit.

The printed circuit plate 62 mounts an electronic control section such as an IC, a power transistor and the like which constitute circuits for generating electrical control signals which control a pressure of brake fluid not to lock the car wheels. As shown in FIG. 22, the printed circuit plate 62 together with the second connector 62b is secured-to an attaching portion 63C on the heat radiation member 63. Heat-generating parts 62A such as a power transistor, a resistor and the like out of the parts mounted on the printed circuit plate 62 are secured at a body 62Aa to an attaching portion 63a of the heat radiation member 63 through an attaching member 63B (however, the other parts on the plate 62 are omitted in FIG. 22).

The first and second connectors 62a and 62b are arranged above the printed circuit plate 62. Contact pieces of the connectors 62a and 62b are connected to terminals on the printed circuit plate 62.

The first connector 62a includes a plurality of terminals 62aa which contact with the terminals 74E of the junction block 7 when the electronic unit 6 is coupled to the junction block 7. The terminals 62aa are supported by a mounting portion 62ab which is made of a resin for molding an intermediate portion of the terminals 62aa.

On the other hand, the second connector 62b has a plurality of terminals 62ba connected to the signal supply lines 15 of the sensors 1 to 4, the electric power lines 16 or the ground lines 18 and a connector housing 62bb which support the terminals 62ha. The connector housing 62bb together with the printed circuit plate 62 is secured to the heat radiation member 63. Also, as shown in FIG. 22, a downwardly extending attaching piece 62bc is integrally formed on the bottom face of the connector housing 62bb. The second connector 62b is disposed in the space 8Aa defined by the connector coupling portion 8A formed on the upper housing 8 with the electronic unit 6 being fixed on the upper housing 8 and junction block 7.

Figure 24:
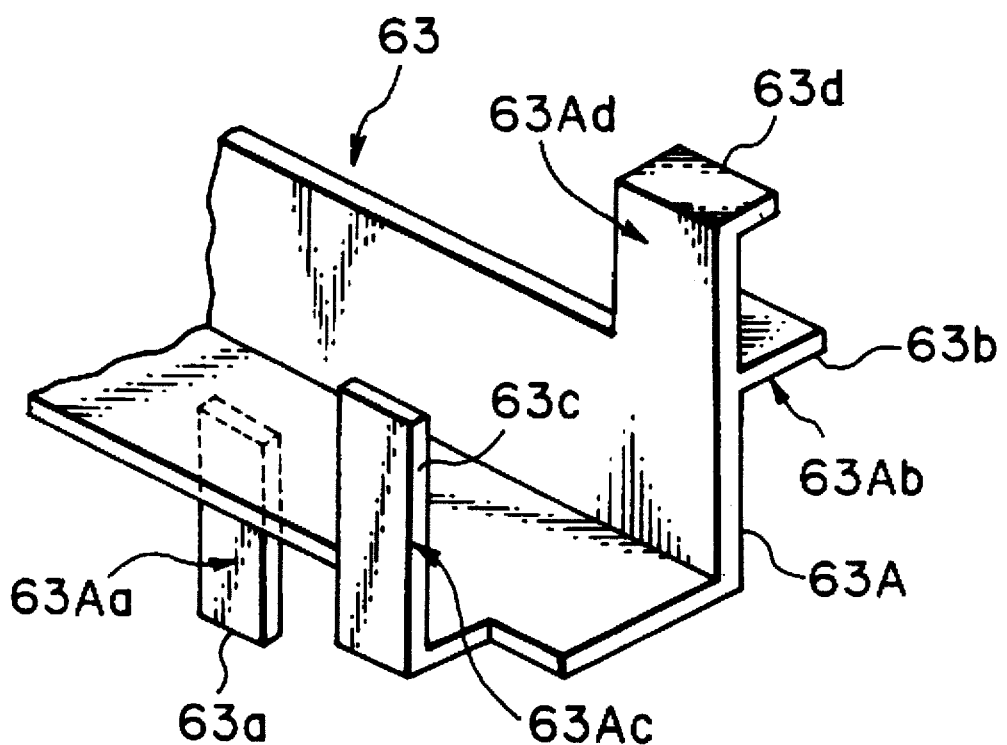
FIG. 24 is a perspective view of a part of a heat radiation member.

As illustrated in FIG. 24, the heat radiation member 63 is made of an aluminum material and has a body 63A extending alone a longitudinal direction of the printed circuit plate 62 and having an L-shaped cross section. The heat radiation member 63 also includes attaching portions 63a, 63b, 63c and 63d on the respective positions on the body 63.

The attaching portion 63a is provided on a lower end of a extension piece 63Aa which extends downwardly from the bottom face of the body 63A. The extension piece 63Aa is provided at a position corresponding to the heat-generating parts 62A mounted on the printed circuit plate 62.

The mounting portion 63b is provided on ends of a plurality of extension pieces 63Ab which extend laterally from a side piece of the body 63A.

The mounting portion 63c is provided on an upper end of an extension piece 63Ac which extends upwardly from a side end of the bottom face of the body 63A. The extension piece 63Ac is provided at a position corresponding to an attaching piece 62bc of the second connector 62b formed above the printed circuit plate 62.

The attaching portion 63d is provided on an upper end of an extension piece 63Ad which extends further upwardly from an upper end of a side piece of the body 63A.

The attaching portions 63a, 63b, 63c and 63d are provided at a position or positions on the body 63, if necessary.

The heat radiation member 63 together with the printed circuit plate 62 is accommodated in the lower housing 61 with the attaching portion 63b being secured to an upper end side of the lower housing 61.

Figure 25:
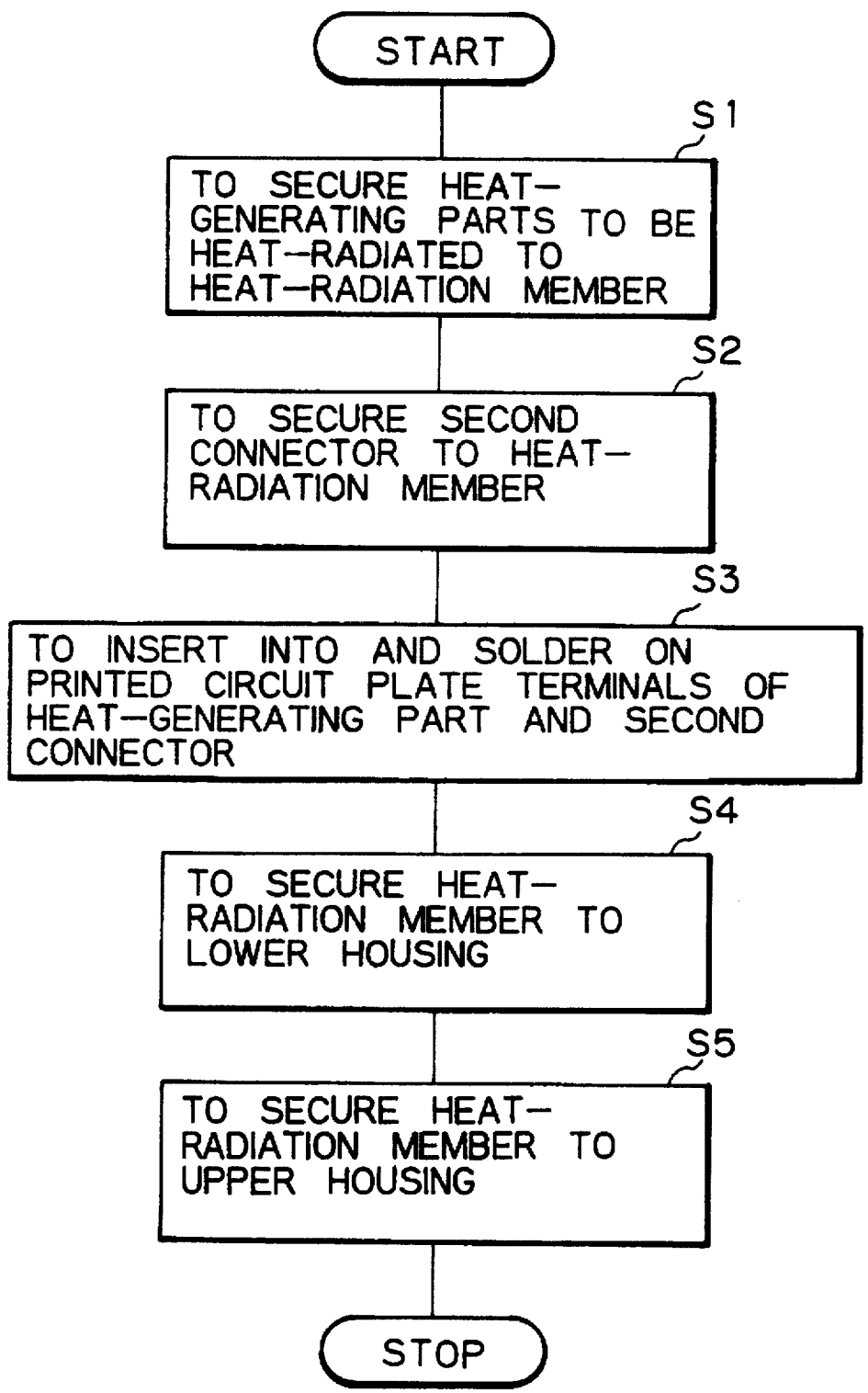
FIG. 25 is a flow chart which illustrates processes of assembling the printed circuit plate accommodating unit.
Figure 26:
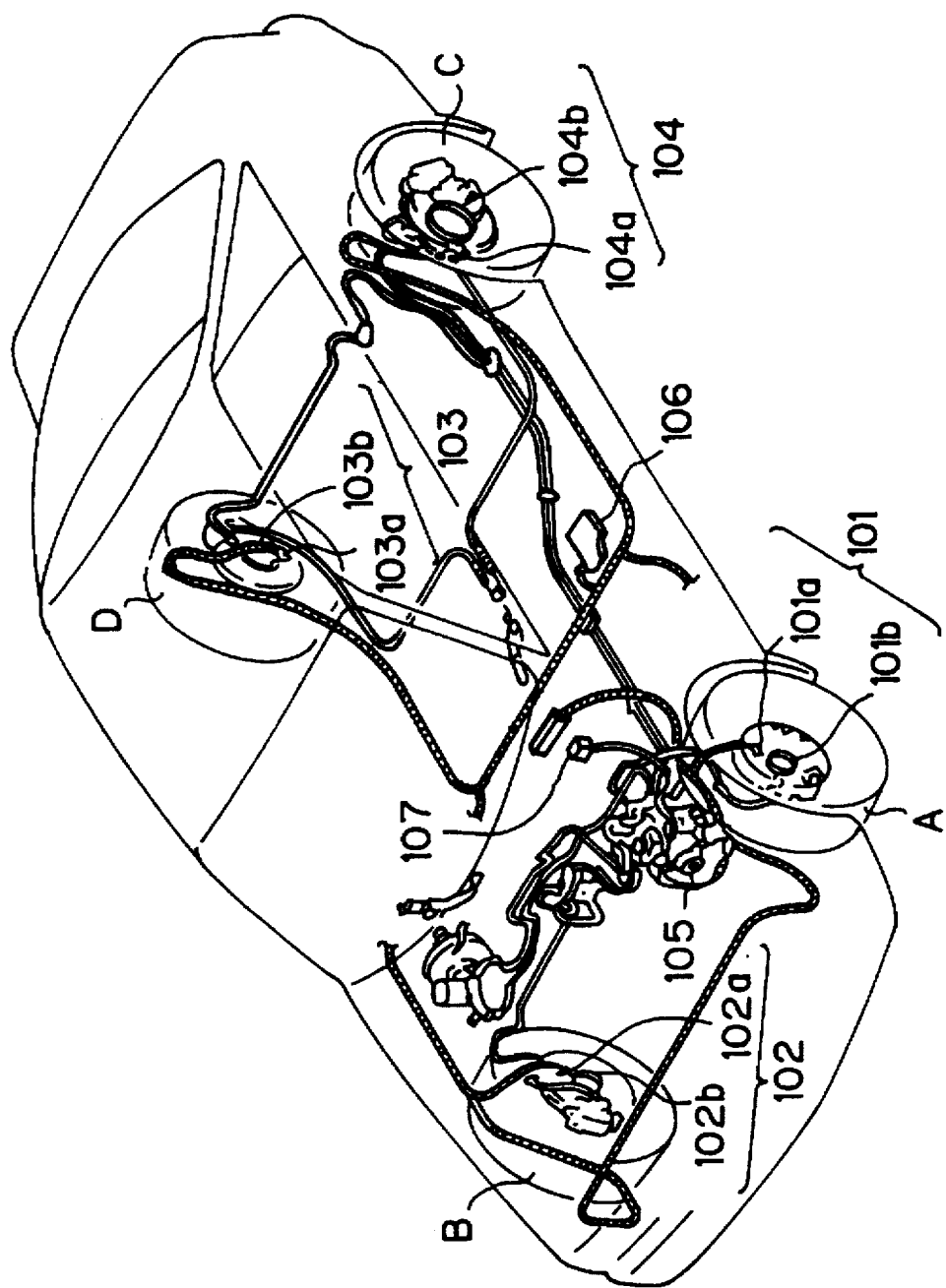
FIG. 26 is an explanatory view of a prior antilock brake system.

A unit U containing the printed circuit plate 62 is assembled in accordance with steps S1 to S5 shown in FIG. 25.

Figure 18:
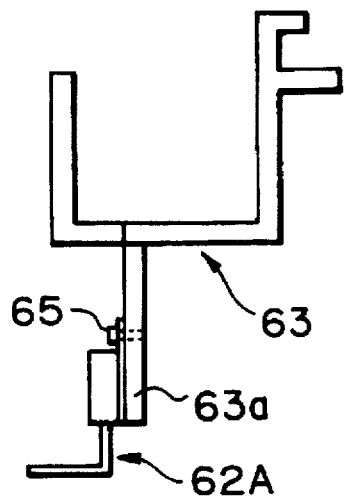
FIG. 18 is a schematic cross sectional view of a printed circuit plate accommodating unit illustrating a step of assembling the unit.

As shown in FIG. 18, in a step S1 parts 62A necessary for radiation is fixed on the attaching portion 63a by a screw 65.

Figure 19:
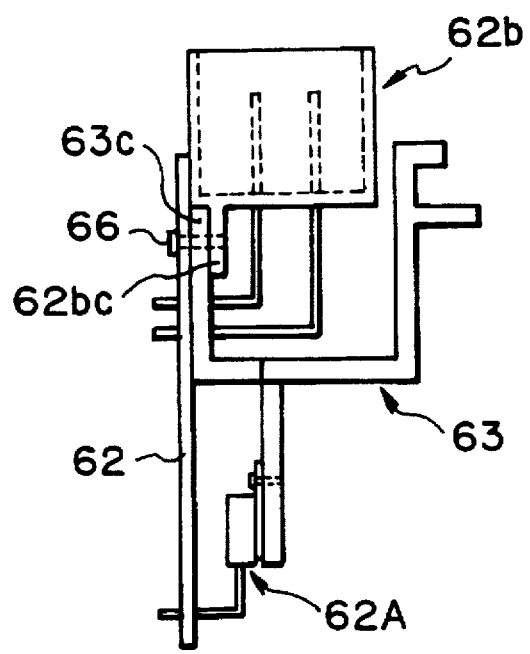
FIG. 19 is a schematic cross sectional view of a printed circuit plate accommodating unit illustrating a step of assembling the unit.

As shown in FIG. 19, in a step S2, the printed circuit plate 62 and the attaching piece 62bc of the second connector 62b are secured to the attaching portion 63c of the heat radiation member 63 by a screw 66.

Figure 20:
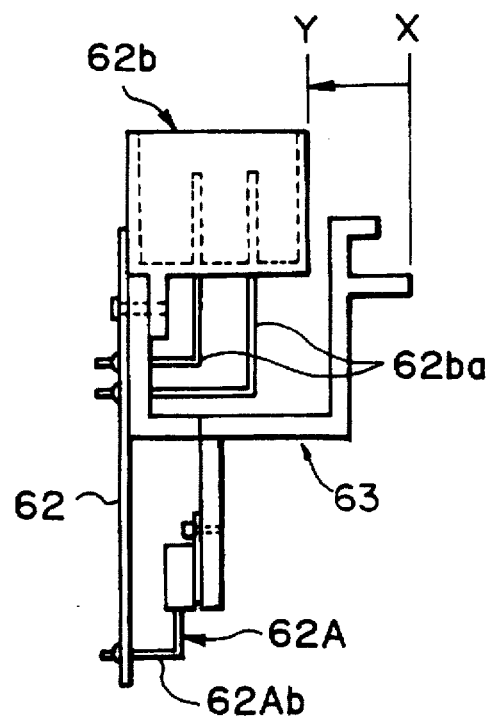
FIG. 20 is a schematic cross sectional view of a printed circuit plate accommodating unit illustrating a step of assembling the unit.

As shown in FIG. 20, in a step S3, the terminal 62Ab of the parts 62A and the terminal 62b of the second connector 62b are soldered to given terminal portions on the printed circuit plate 62.

An assembly comprising the heat radiation member the printed circuit plate 62, the parts 62A, and the second connector 62b and formed by the steps S1 to S3 is subject to fluctuation of a side position Y of the second connector relative to an end of the heat radiation as the reference position X due to only tolerance errors of the heat radiation and the second connector 62b.

Figure 21:
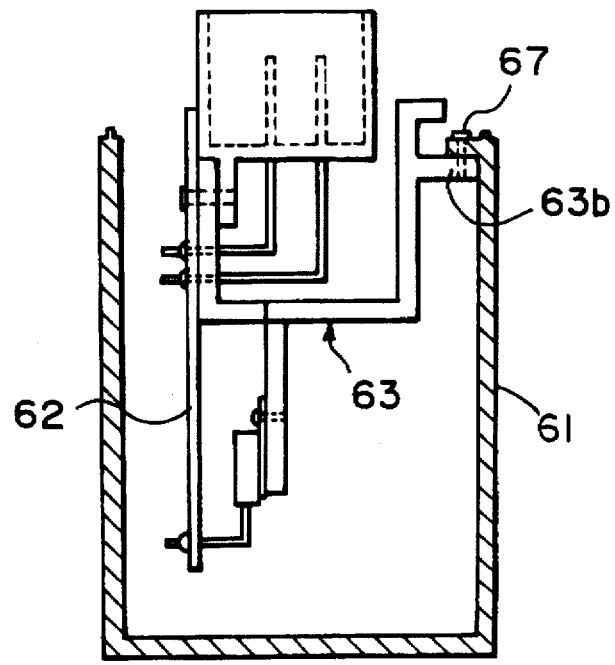
FIG. 21 is a schematic cross sectional view of a printed circuit plate accommodating unit illustrating a step of assembling the unit.

As shown in FIG. 21, in a step S4, the attaching portion 63b of the heat radiation member 63 is secured to the lower housing 61 by screws 67. The heat radiation member 63 and the printed circuit plate 62 fixed on the member 63 are fixed and accommodated in the lower housing 61.

As shown in FIG. 22, in a step S5, the upper housing 8 united to the junction block 7 beforehand (the junction block 7 is not shown in FIG. 22) is secured to the attaching portion 63d of the heat radiation member 63 by screws 68. The projection 81a of the electronic unit 6 is inserted through an adhesive with a sealing function (not shown) into the grooves 8b and 71g formed in the upper housing 8 and the lower housing 61 of the junction block so that the electronic unit 6, junction block 7, and upper housing 8 are united (FIG. 8C).

In the step S5, the second connector 62b of the electronic unit 6 is disposed in the space 8Aa in the connector coupling portion 8A of the upper housing 8. Further, the terminals 62a connected to the printed circuit plate 82 in the electronic unit 6 are connected to the terminals 74E formed integrally on the bus bar 74. The terminals 74B of the junction body 72 is disposed in the space 8A in the connector socket 8A of the upper housing 8, the terminals T4C and 74D are arranged below the sockets 8Ba and 8Bb, and the terminals 74F are arranged inside the connector 8Bc for a diode.

In the steps S4 to S5 of uniting the heat radiation member 68, lower housing 61, and upper housing 8, a fluctuation of an inner face position Z of one side wall on the connector socket 8A of the upper housing 8 relative to the reference position X set on an end of the heat radiation member 83 depends on only errors caused by coupling of the heat radiation member 88 and the upper housing 8 (FIG. 22).

Figure 23:
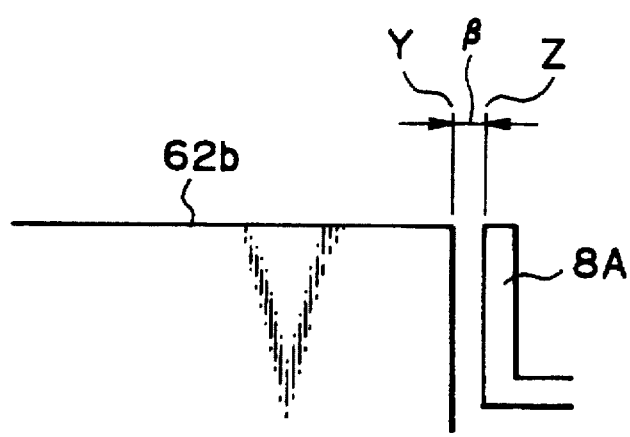
FIG. 23 is an enlarged view of a main part of FIG. 22.

Referring to FIG. 23 it will be apparent from the foregoing that in the printed circuit plate containing unit U having the heat radiation member 63 a necessary clearance β between the side face position Y of the second connector 62b and the inner face position Z of one side wall of the connector socket 8A is determined in accordance with the maximum tolerance error of the heat radiation member 63 and the second connector 62b caused in the steps S1 to S5 and the maximum tolerance error of the heat radiation member 63 and the upper housing 8 caused in the steps S4 and S5. That is, in the unit U, a tolerance error of the printed circuit plate 62 and parts 62A, a coupling error of the plate 62, parts 62 and member 63, or a coupling error of the plate 62 and second connector 62b does not become a factor for determining the clearance μ.

According to the printed circuit plate containing unit, since the tolerance error of the printed circuit plate and the parts mounted on it does not become a factor which determines the clearance between the connector socket formed on the upper housing and the connector to be arranged on the connector socket, the clearance can be set to be smaller than the prior art. Accordingly, it is possible to prevent dusts from entering into the unit through the clearance between the connector socket and the connector. In addition, it is possible to compact the printed circuit plate containing unit.

What is claimed is:

1. An antilock brake system comprising:
   a sensor for detecting a rotating condition of each wheel of an automobile;
   a hydraulic power unit having coupling ports for brake fluid pipes and for controlling a pressure of brake fluid in a wheel cylinder of each wheel by means of an electrical control signal, said coupling ports being provided on an upper, front, or rear wall of said unit;

an electronic unit containing a circuit for generating said control signal which controls said pressure of brake fluid so that the wheel is not locked in response to a detecting signal from said sensor; and a junction block having a housing formed integrally with a housing of said electronic unit and an electrical wiring section disposed in said junction block housing and electronically connection said circuit of said electronic unit and a circuit of said hydraulic power unit, wherein said electronic unit and said junction block being detachably and directly coupled to an attaching portion formed on a side face of said hydraulic power unit, said electronic unit and said junction block forming a united assembly.

2. An antilock brake system according to claim 1, further comprising:

a first set of terminals provided in said electronic unit and connected electrically to a wire harness from the system;

a second set of terminals provided in said junction block and connected electrically to the wire harness from the system;

a housing member integrally forming at least a part of said housing of said electronic unit and at least a part of said housing of said junction block; and a connector socket enclosing said first and second sets of terminals and detachably mating with a connector connected to an end of the wire harness from the system.

3. An antilock brake system according to claim 1, wherein said electronic unit has a printed circuit plate containing a circuit for generating said control signal which controls said pressure of brake fluid so that the wheel brakes do not lock in response to a detecting signal from said sensor, and wherein united housings constituting said united assembly of said electronic unit and said junction block are mounted on said hydraulic power unit with said printed circuit plate of said electronic unit being disposed in said united housings in a vertical plate surface direction.

4. An antilock brake system according to claim 3, wherein said united assembly of said electronic unit and said junction block is disposed on the side face of said hydraulic power unit at the position in which the projection of the side face of said united assembly exists within a rectangle plane defined by a maximum height and depth of said hydraulic power unit.

5. An antilock brake system according to claim 1, wherein the interior of said housing of said electronic unit further comprises an insulation gel.

6. An antilock brake system according to claim 5, wherein said housing of said electronic unit is provided with a sol-pouring port.

7. An antilock brake system according to claim 1, wherein said electronic unit has a first connecting section for connecting a printed circuit plate to said electrical wiring section of said junction block and a second connecting section for connecting said printed circuit plate to a wire harness from the system, wherein an upper end of said printed circuit plate at a position corresponding to said second connecting section is higher than the upper end of said printed circuit plate at a position corresponding to said first connecting section, wherein said junction block is disposed above said printed circuit plate of said electronic unit at the position corresponding to said first connecting section, and wherein said housing of said junction block comprises an upper side and a lower side, wherein the upper side has a wall which is higher than the upper end of said printed circuit plate at the position corresponding to said second connecting section, and a bottom plate coupled to said side walls, at least a part of said bottom plate being a part of an upper housing of said electronic unit.

8. An antilock brake system according to claim 7, wherein at least the upper side of said lower housing of said junction block is closed by said upper housing, a terminal electrically connected to an electrical element mounted on said upper housing stands on said electrical wiring section, a sol-pouring port is provided on a common portion of said housings of said electronic unit and said junction block, a cover which covers said electrical element and said sol-pouring port is mounted on said upper housing, and said cover is provided on an interior with a protrusion which chokes said sol-pouring port when mounted on said upper housing.

9. An antilock brake system according to claim 8, wherein a connector cover which covers a connector coupled to a connector socket is mounted on said junction block united on said electronic unit, and wherein said electronic unit and connector cover are provided with a pair of male and female coupling portions which serve to guide said connector cover when it is mounted on said junction block and to maintain at a given distance a gap between outer peripheries of said electronic unit and said connector cover mounted on said junction block by a difference between a height of the male portion and a depth of the female portion.

10. An antilock brake system according to claim 8, wherein said printed circuit plate is disposed in a space made of metal defined by said upper housing and said lower housing, a heat radiation member is interposed between said lower housing and a part to be heat-radiated on said printed circuit plate, and a connector having a connecting terminal connected electrically to said circuit on said printed circuit plate is put on the connector coupling portion formed on said upper housing, and wherein said heat radiation member has a fixing portion of said upper housing and a fixing portion of said connector.

11. An antilock brake system comprising:

a sensor for detecting a rotating condition of each wheel of an automobile;

a hydraulic power unit having coupling ports for brake fluid pipes and for controlling a pressure of brake fluid in a wheel cylinder of each wheel by means of an electrical control signal, said coupling ports being provided on an upper, front, or rear wall of said unit;

an electronic unit containing a circuit for generating said electrical control signal which controls said pressure of brake fluid so that the wheel is not locked in response to a detecting signal from said sensor; and a junction block having a housing formed integrally with a housing of said electronic unit and an electrical wiring section disposed in said junction block housing and electrically connecting said circuit of said electronic unit and at least one circuit of said hydraulic power unit, wherein a united assembly of said electronic unit and said junction block are detachably coupled to an attaching portion formed on a side face of said hydraulic power unit, and further comprising:

a plurality of relays connected electrically to at least one of said circuits of said hydraulic power unit and said electronic unit and disposed in an engine compartment of the automobile;

a first connector connected to a first wire harness from an electrical system; and a second connector connected to a second wire harness including wires connected to said hydraulic power unit;

wherein the electrical wiring section disposed in said junction block housing includes a first set of terminals connected electrically to said first connector, a second set of terminals connected electrically to said second connector, a third set of terminals connected electrically to said respective relays, and a fourth set of terminals connected electrically to terminals connected to a printed circuit plate in of said electronic unit.

12. An antilock brake system according to claim 11, wherein said hydraulic power unit is provided with attaching portions on opposite side faces of the hydraulic power unit for mounting said united assembly of said electronic unit and said junction block.

13. An antilock brake system according to claim 11, further comprising:

a first set of terminals provided in said electronic unit and connected electrically to the wire harness from the system;

a fifth of terminals provided in said junction block and connected electrically to the wire harness from the system;

a housing member integrally forming at least a part of said housing of said electronic unit and at least a part of said housing of said junction block; and a connector socket enclosing said first and fifth sets of terminals and detachably mating with a connector connected to an end of the wire harness from the system.

14. An antilock brake system according to claim 11, wherein said electronic unit has a printed circuit plate containing a circuit for generating said control signal which controls said pressure of brake fluid so that the wheel brakes and does not lock in response to a detecting signal from said sensor, and wherein united housings constituting said united assembly of said electronic unit and said junction block are mounted on said hydraulic power unit with said printed circuit plate of said electronic unit being disposed in said united housings in a vertical plate surface direction.

15. An antilock brake system according to claim 14, wherein said united assembly of said electronic unit and said junction block is disposed on the side face of said hydraulic power unit at the position in which the projection of the side face of said united assembly exists within a rectangle plane defined by the maximum height and depth of said hydraulic power unit.

16. An antilock brake system according to claim 14, wherein the interior of said housing of said electronic unit further comprises an insulation gel.

17. An antilock brake system according to claim 16, wherein said housing of said electronic unit is provided with a sol-pouring port.

18. An antilock brake system according to claim 11, wherein said electronic unit has a first connecting section for connecting said printed circuit plate to said electrical wiring section disposed in said junction block housing and a second connecting section for connecting said printed circuit plate to the first wire harness from the electrical system, wherein an upper end of said printed circuit plate at a position corresponding to said second connecting section is higher than the upper end of said printed circuit plate at a position corresponding to said first connecting section, wherein said junction block is disposed above said printed circuit plate of said electronic unit at the position corresponding to said first connecting section, and wherein said junction block housing comprises an upper side and a lower side, wherein the upper side has a wall which is higher than the upper end of said printed circuit plate at the position corresponding to said second connecting section, and a bottom plate coupled to said side walls, at least a part of said bottom plate being a part of an upper housing of said electronic unit.

19. An antilock brake system according to claim 18, wherein at least the upper side of said lower housing of said junction block is closed by said upper housing, a terminal electrically connected to an electrical element mounted on said upper housing stands on said electrical wiring section, a sol-pouring port is provided on a common portion of said housings of said electronic unit and said junction block, a cover which covers said electrical element and said sol-pouring port is mounted on said upper housing, and said cover is provided on an interior with a protrusion which chokes said sol-pouring port when mounted On said upper housing.

20. An antilock brake system according to claim 19, wherein a connector cover which covers a connector coupled to a connector socket is mounted on said junction block united on said electronic unit, and wherein said electronic unit and connector cover are provided with a pair of male and female coupling portions which serve to guide said connector cover when it is mounted on said junction block and to maintain at a given distance a gap between outer peripheries of said electronic unit and said connector cover mounted on said junction block by a difference between a height of the male portion and a depth of the female portion.

21. An antilock brake system according to claim 19, wherein said printed circuit plate is disposed in a space made of metal defined by said upper housing and said lower housing a heat radiation member is interposed between said lower housing and a part to be heat-radiated on said printed circuit plate, and a connector having a connecting terminal connected electrically to said circuit on said printed circuit plate is put on the connector coupling portion formed on said upper housing, and wherein said heat radiation member has a fixing portion of said upper housing and a fixing portion of said connector.

* * * * *

UNITED STATES PATENT AND TRADEMARK OFFICE
CERTIFICATE OF CORRECTION

PATENT NO.   : 5,695,259
DATED        : December 9, 1997
INVENTOR(S)  : Isshiki et al It is certified that error(s) appears in the above-identified patent and that said Letters Patent is hereby corrected as shown below:

Title pge,
Item [30]: the fifth priority, Japan 4-358473, date should be corrected to read --Dec. 25, 1992--.

Signed and Sealed this

Twentieth Day of October, 1998

*Attest:*

BRUCE LEHMAN

*Attesting Officer*     *Commissioner of Patents and Trademarks*